(12) United States Patent
Allen

(10) Patent No.: US 8,182,683 B1
(45) Date of Patent: May 22, 2012

(54) PORTABLE FLUID DISPENSER

(76) Inventor: Russell E. Allen, Hermosa Beach, CA (US)

( * ) Notice: Subject to any disclaimer, the term of this patent is extended or adjusted under 35 U.S.C. 154(b) by 184 days.

(21) Appl. No.: 12/466,781

(22) Filed: May 15, 2009

(51) Int. Cl.
*B01D 35/26* (2006.01)

(52) U.S. Cl. .................. 210/244; 210/416.3; 210/467; 210/472; 210/475; 222/189.11

(58) Field of Classification Search .............. 210/85, 210/244, 245, 416.3, 464, 416.1, 467, 472, 210/474, 475; 222/189.06, 189.07, 189.08, 222/189.11, 209, 210; 215/3, 4, 6; 220/666
See application file for complete search history.

(56) References Cited

U.S. PATENT DOCUMENTS

| | | | | |
|---|---|---|---|---|
| 703,654 | A * | 7/1902 | Hall | 222/189.11 |
| 2,687,227 | A * | 8/1954 | Guth | 215/3 |
| 2,761,833 | A * | 9/1956 | Ward | 210/85 |
| 3,341,083 | A * | 9/1967 | Stewart | 222/209 |
| 3,777,941 | A * | 12/1973 | Riddle | 222/207 |
| 4,072,249 | A * | 2/1978 | Ekenstam et al. | 222/95 |
| 4,600,130 | A * | 7/1986 | Libit | 222/209 |
| 4,629,098 | A | 12/1986 | Eger | |
| 5,029,719 | A | 7/1991 | Solomon | |
| 5,609,759 | A | 3/1997 | Nohren, Jr. et al. | |
| 5,681,463 | A | 10/1997 | Shimizu et al. | |
| 5,919,365 | A * | 7/1999 | Collette | 210/419 |
| 6,004,460 | A | 12/1999 | Palmer et al. | |
| 6,010,626 | A | 1/2000 | D'Agostino | |
| 6,117,319 | A | 9/2000 | Cranshaw | |
| 6,136,188 | A * | 10/2000 | Rajan et al. | 210/244 |
| D433,729 | S | 11/2000 | Poirier et al. | |
| 6,153,096 | A | 11/2000 | Nohren, Jr. | |
| 6,165,362 | A | 12/2000 | Nohren, Jr. et al. | |
| 6,478,956 | B2 * | 11/2002 | Kaura | 210/232 |
| 6,569,329 | B1 | 5/2003 | Nohren, Jr. | |
| D491,018 | S | 6/2004 | Vinarsky | |
| 2007/0221602 | A1 * | 9/2007 | Dib | 215/6 |

OTHER PUBLICATIONS

Web site excerpt printed on Aug. 6, 2008 from www.rei.com online catalog illustrating a variety of water bottles and related filtration accessories, 2 pgs.
Web site excerpt printed on Aug. 6, 2008 from www.rei.com online catalog illustrating a variety of water bottles, primarily of the hard walled variety, 2 pgs.
Web site excerpt printed on Aug. 6, 2008 from www.rei.com online catalog illustrating a variety of water bottles, 1 pg.
Web site article printed on Aug. 20, 2008 and purportedly published on Mar. 18, 2006, entitled How to Choose a Water Bottle taken from www.outdooreyes.com, 2 pgs.
Web site excerpt printed on Jan. 20, 2009 from www.camelbak.com illustrating the Podium Bottle, 1 pg.
Web site excerpt printed on Jan. 20, 2009 from www.camelbak.com illustrating the Better Bottle, 1 pg.

(Continued)

*Primary Examiner* — Matthew Savage
(74) *Attorney, Agent, or Firm* — Advantage IP Law Firm

(57) ABSTRACT

A portable fluid dispenser for transporting and optionally filtering a stored quantity of fluid as it is expelled from the dispenser is provided herein as having a dispenser body with a port and an aperture in communication with a fluid storage chamber with the aperture being disposed in a substantially rigid region of the dispenser body and at least partially covered by a depressable region that may be depressed to at least partially reduce the volume in the fluid storage chamber to force fluid stored in the fluid storage chamber out the port.

19 Claims, 16 Drawing Sheets

OTHER PUBLICATIONS

Web site excerpt printed on Jan. 20, 2009 from www.camelbak.com illustrating the Performance Bottle, 1 pg.
Web site excerpt printed on Jan. 20, 2009 from www.mysigg.com illustrating the Sigg Silver Traveler water bottle, 1 pg.
Web site excerpt printed on Jan. 20, 2009 from www.katadyn.com illustrating the ExstreamXR water bottle, 1 pg.
NP10-Web site excerpt printed on Jan. 20, 2009 from www.katadyn.com illustrating the Exstream water bottle, 1 pg.
NPL11-Web site excerpt printed on Mar. 11, 2009 from www.guyotdesigns.com illustrating the TapGuard for widemouth water bottles, 1 pg.
NPL12-Web site excerpt printed on Mar. 11, 2009 from www.gearzone.com illustrating the Aquamire Water Bottle & Filter, 1 pg.
NPL13-Web site excerpt printed on Mar. 11, 2009 from www.envirotechproducts.com illustrating the Clear Brook Portable Water Filter bottle, 1 pg.
NPL14-Web site excerpt printed on Mar. 12, 2009 from www.waterfilters.net illustrating an Innova Waterway 16 oz. PET Water Bottle, 1 pg.
NPL15-Web site excerpt printed on May 15, 2009 from www.purewater2go.com.com illustrating a variety of filters for use with a conventional water bottle, 4 pgs.

* cited by examiner

PORTABLE FLUID DISPENSER

BACKGROUND

1. Field of the Invention

The present invention relates to portable fluid dispensers and more specifically to portable fluid dispensers that may incorporate a filter for improving the quality of the fluid imbibed therefrom.

2. Background Art

In parts of the world, preferred sources of clean water may be available from household taps or faucets supplied and monitored by local water utilities, or may be available from local wells or water containers or bottles purchased from local markets. In many cases, the cleanliness of the water is already sufficient and filtering is unnecessary. In other cases and in much of the world, the cleanliness of the water is questionable and light or heavy filtering may be needed. Thus, a user may opt to install a filtration system to improve the quality of water if desired and units are available and affordable. Given the health benefits of clean water and that local water sources are not always at the level of cleanliness demanded by consumers, the demand for transportable bottled water arose continues to rise as one solution to unclean source water. This is also true, however, even in areas with sources of clean tap water as some bottled water carries a certain prestige for or is a personal preference of consumers.

Typically such bottled water is packaged in the now ubiquitous portable plastic bottle with a removable cap or reciprocal valve and mouthpiece. In order to mass produce these plastic bottles and maintain a reasonable profit margin, these bottles are typically manufactured of an extremely thin-walled plastic material. The thin walls are easily punctured or the bottle may easily be deformed or crushed to the point of uselessness, particularly once the water is at least partially removed. It is also common for this type of bottle to crack or remain in a crushed configuration after only one or two uses. As a result, the durability of such plastic bottles is limited and these type of bottles are commonly thrown out after only one use.

In some instances, another problem arises if the bottles are also manufactured from a plastic containing the chemical Bisphenol-A (BPA). This chemical has relatively recently been determined as detrimental to human health, especially when the bottle is heated or deformed due to wear and tear as either event increases the likelihood that the hazardous chemical may leach into the water contained in the bottle. In addition to the thin-walled drawbacks, this further increases the incentive not to re-use any plastic water bottles containing such a chemical causing consumers to continually purchase new water bottles.

With the relatively recent introduction of the BPA-free plastics for plastic bottles, this problem is alleviated somewhat but other problems remain from the use of the thin-walled plastic bottles. Even though the bottle may be BPA free, the lack of durability contributes to disposing the bottles on a more regular basis. Accordingly, even as the demand for bottled water increases, there is also an opposite push for reducing the amount of landfill waste resulting from the disposal of the plastic bottles. While recycling does somewhat address this issue, it remains an imperfect system as participation is often voluntary or loosely enforced and is not a universal approach to the problem. Recycling also does nothing to reduce the demand for bottled water in the first place.

In addition to the frequent disposal and related landfill issues, when a preferred clean water source is not available, as is the case in many countries, or such as commonly occurs during local or long-distance travel, the need for a personal water carrier becomes paramount as other more local water sources such as water fountains, faucets, streams, lakes, and the like may be questionable, unavailable, or undesirable, especially if there is no filter in place. This need for clean transportable water is the primary motivation that fuels the consumer demand for bottled water. However, this rising demand for transportable, bottled water products continues to be at odds with the environmental push for recycling to reduce land fill waste and also for reducing the dependency and need on oil-based plastic products. There is also the cost associated with the energy to manufacture and transport the bottled water, often touted as being derived from remote pristine locations. Thus, a multi-prong approach to reduce the demand for bottled water stored in disposable or limited use plastic bottles and to reduce the amount of landfill waste is needed.

One approach is to use a personal water bottle that is both BPA-free and constructed of a more rigid, crush-resistant, plastic or metallic material that can better withstand the rigors of travel. The user may also install a filter at home to further purify the preferred water source if desired. The rigid-walled plastic or metallic bottles may be filled up at the preferred source and transported as needed. Given the higher strength of these rigid materials, the use of these hard plastic or metallic bottles does reduce the demand for thin-walled mass produced plastic bottles somewhat and the corresponding landfill waste since bottles may be re-used for longer periods of time but such rigid bottles still have drawbacks.

More specifically, these inflexible, rigid walled bottles do not accommodate a filter component and thus a separate external filter component must be carried if filtering is desired. Once the water runs out that was filled from the original preferred source, a problem arises if the user is no longer near the original preferred source and the local water source is less than desirable and requires filtering and no filtering unit is available. Thus, the user is at the mercy of the local water source that may or may not be suitable for drinking or less healthy at any rate. Transporting a filled water carrier may also be an imposition on the user at certain events or locations such as concerts, sporting events, or the airport where the fluid and/or container must be disposed of before entering the venue.

Another category of personal water carrier is a soft-walled bottle. These bottles are typically formed of a softer plastic and may be deformed by squeezing the flexible sidewalls of the bottle to force fluid out through a mouthpiece. In addition, the soft-walled bottles may accommodate the use of a filter component that is typically connected inline with the mouthpiece as, for example, shown in U.S. Pat. No. 6,165,362 to Nohren, Jr. et al. With such a bottle, the user may squeeze the sidewalls of the bottle together to force water through the filter and out the mouthpiece.

While U.S. Pat. No. 6,165,362 also discloses the use of a filter with a purportedly relatively rigid plastic bottle, it is clear that a "relatively" rigid plastic bottle would have to be somewhat flexible or deformable or there would be no additional boost to the flow rate through the filter and the user would have to rely solely on gravity or their own sucking force to draw water out of the bottle through the filter. This is clearly a drawback of an inflexible rigid walled container and may render the bottle quite useless or frustrate the user if the filter flow rate is relatively low which may be expected with a useful filter. Given the foregoing, the relatively rigid bottle described in U.S. Pat. No. 6,165,362 is likely either completely rigid or relatively inflexible and therefore a poor design, especially when a relatively limited amount of water remains in the bottle relative to the bottle volume, or such bottle must be constructed and behave as if a soft-walled bottle with sufficiently flexible sidewalls to enable the sidewalls of the bottle to be squeezed together to force fluid through the filter for a greater fluid flow rate and thus has the drawbacks of soft-walled bottles as discussed below.

While these soft-walled bottles incorporating a filter do last longer than a mass produced thin-walled bottle and decrease the need for limited use disposable thin-walled water bottles and the amount of landfill, the soft-walls have some drawbacks as well. Primarily, these soft-walled bottles are not as rugged as the hard-walled bottles and are prone to puncturing, scratching, cracking, or wearing out over relatively short period of time. In addition, the ability to deform the entire sidewalls from of the containers from top to bottom may put the integrity of the filter at risk. Soft-walled bottles are also not constructed to withstand a significant amount of compressive force and may collapse if stored inappropriately. Thus, while these bottles are suitable for many purposes, these bottles do not handle the rigors of travel or last as long as hard-walled bottles. In addition, it is common to use a three-stage filter to eliminate viruses, particulate, and organisms, a thus a relatively strong grip or even two hands may be needed to force fluid through the filter. While useful in certain scenarios, the three-stage filter may be more than needed in many scenarios and continued use may be fatiguing to the user.

Given the drawbacks of personal fluid dispenser technology, there exists a need for a reusable portable fluid dispenser with the preferred capability of improving water quality at any place and any time a water source is available while better withstanding the rigors of travel.

SUMMARY

In accordance with the principles of the present invention, a preferred embodiment of a portable fluid dispenser is provided with a dispenser body with a fluid storage chamber and having a substantially rigid region and both a port and an aperture in communication with the fluid storage chamber with the aperture being at least partially covered by a button formed at least partially of a resilient material that may be depressed to at least partially reduce the volume of the fluid storage chamber.

In another feature of the present invention, a filter may be incorporated between the port and the fluid storage chamber to improve the quality of fluid being expelled from the fluid storage chamber.

In a related feature of the present invention, the filter may include a removably engaged filter housing with an exchangeable filter cartridge to facilitate prolonged use of the fluid dispenser.

Another aspect of the present invention is the provision of a plurality of depressable regions that may be selectively depressed to force fluid stored in the fluid storage chamber out of an exit port.

Other aspects of the present invention include an optional removable bottom piece for receiving a removable advertising or customization insert.

In yet another aspect of the present invention, a frame defining the perimeter of the aperture is provided to anchor the button.

Other aspects of the present invention will become apparent with further reference to the following drawings and specification.

DETAILED DESCRIPTION

Figure 1:
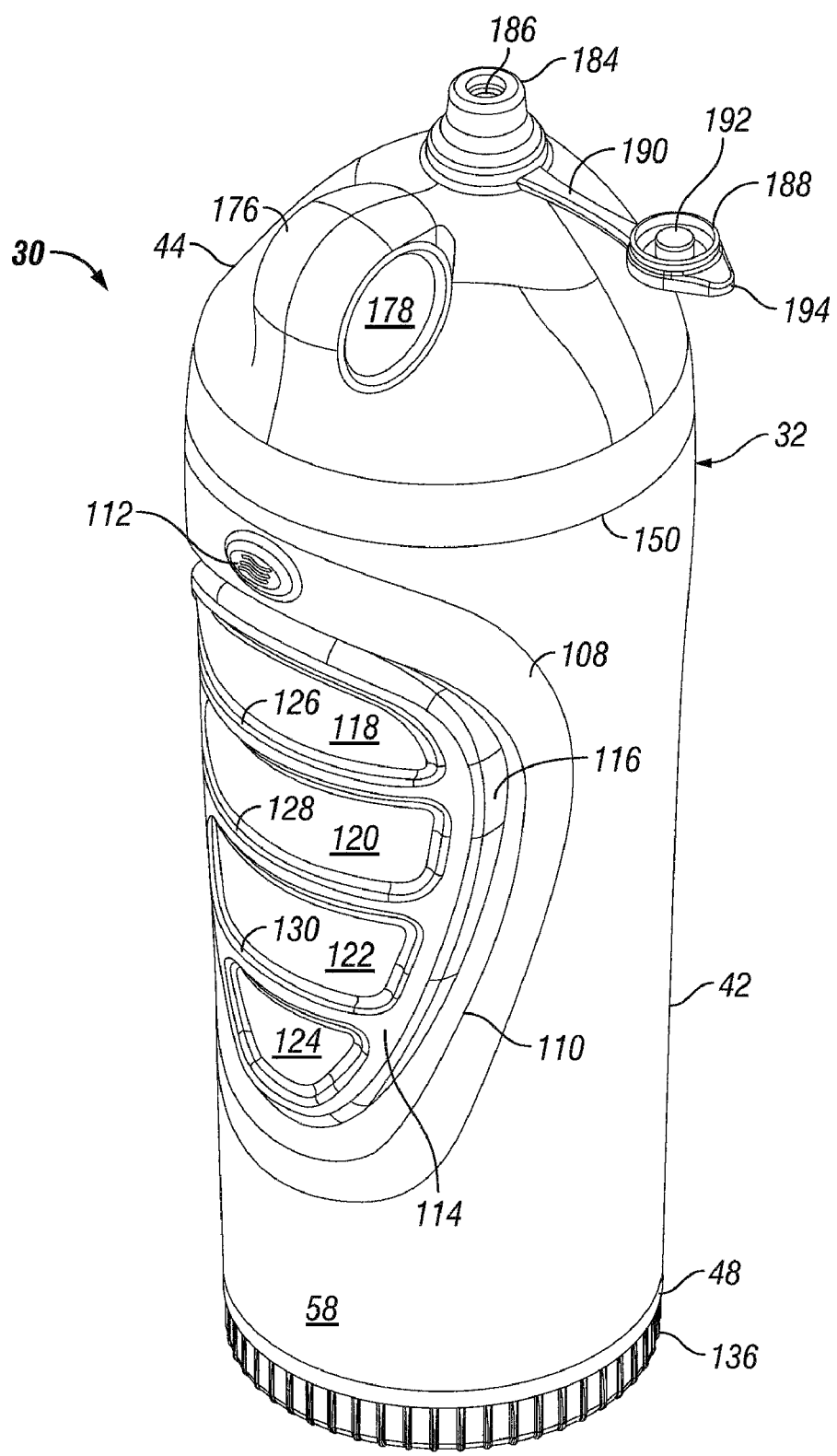
FIG. 1 is a right forward upper perspective view of an exemplary embodiment of an uncapped portable fluid dispenser in accordance with the principles of the present invention.

Referring now to FIGS. 1-8, an exemplary first embodiment of a personal fluid dispenser, generally designated 30 and in accordance with the principles of the present invention, is illustrated. Referring specifically now to the perspective views in FIGS. 1 and 8, the portable fluid dispenser 30 includes a dispenser body, generally designated 32, with a substantially rigid region and having a fluid storage chamber 34 (FIG. 8) for holding a quantity of fluid, a port 36 and an aperture 38, both in communication with the fluid storage chamber and with the aperture appearing in the rigid region, and a button 40 at least partially covering the aperture with the button providing a depressable region to reduce the volume of the fluid storage chamber.

Figure 7:
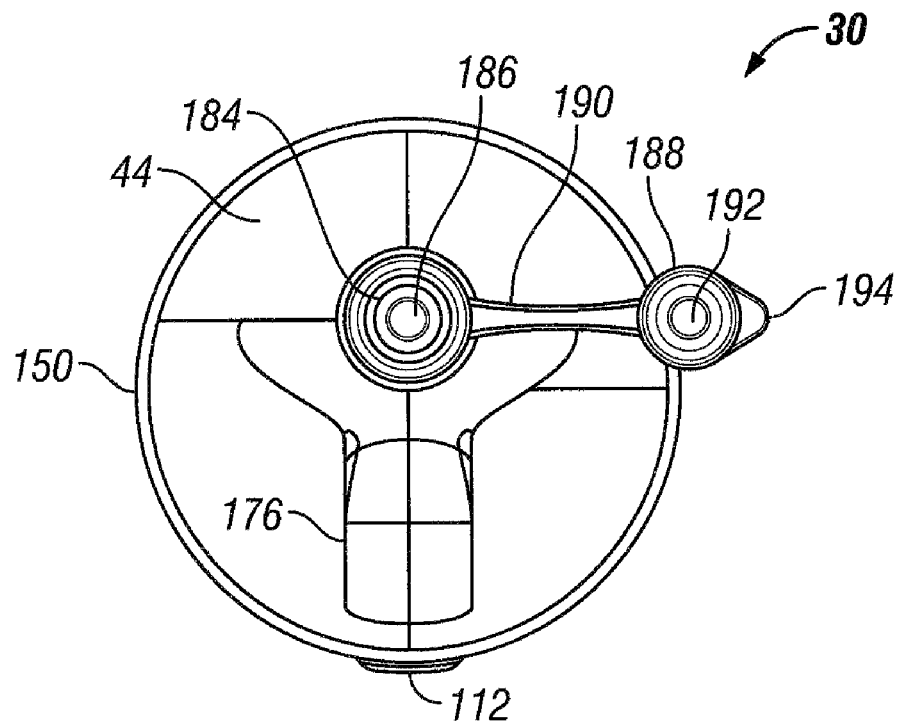
FIG. 7 is a top plan view of the portable fluid dispenser of FIG. 1, in reduced scale.

With reference to FIGS. 1-5 and 8, in this exemplary embodiment, the dispenser body 32 is constructed with a generally cylindrically shaped canister 42 that is removably coupled to a substantially dome-shaped lid 44 (also in FIG. 7). The canister 42 includes a cylindrical sidewall 46 projecting upwardly from a flat base 48. At the top open end 50 of the canister (FIG. 8), a short externally threaded neck 52 is provided. The neck is recessed from the outer surface of the sidewall to form a platform 54 for receiving a gasket 56 that forms a tighter seal between the lid and canister when coupled together.

Figure 2:
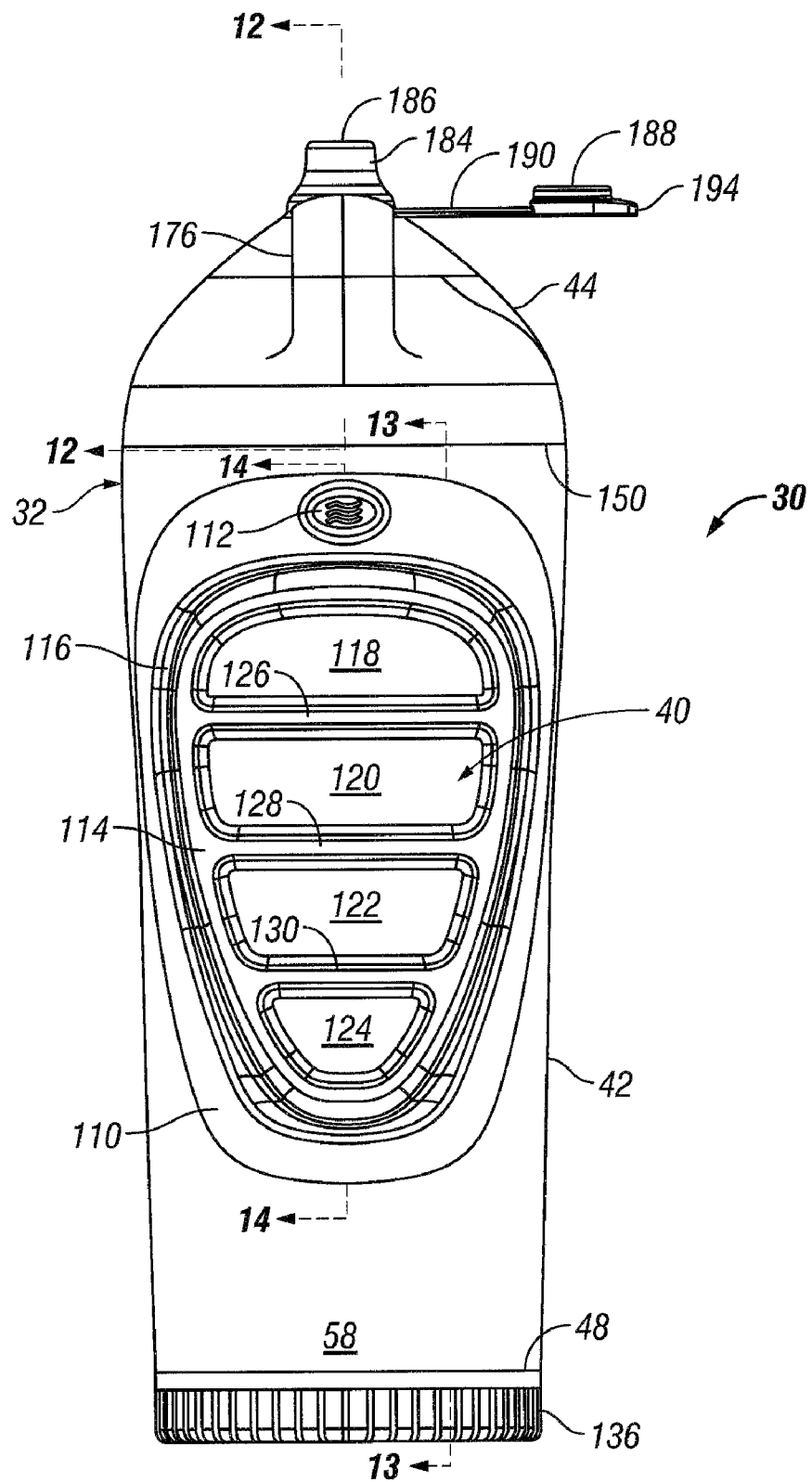
FIG. 2 is a front elevation view of the portable fluid dispenser of FIG. 1, in reduced scale.
Figure 8:
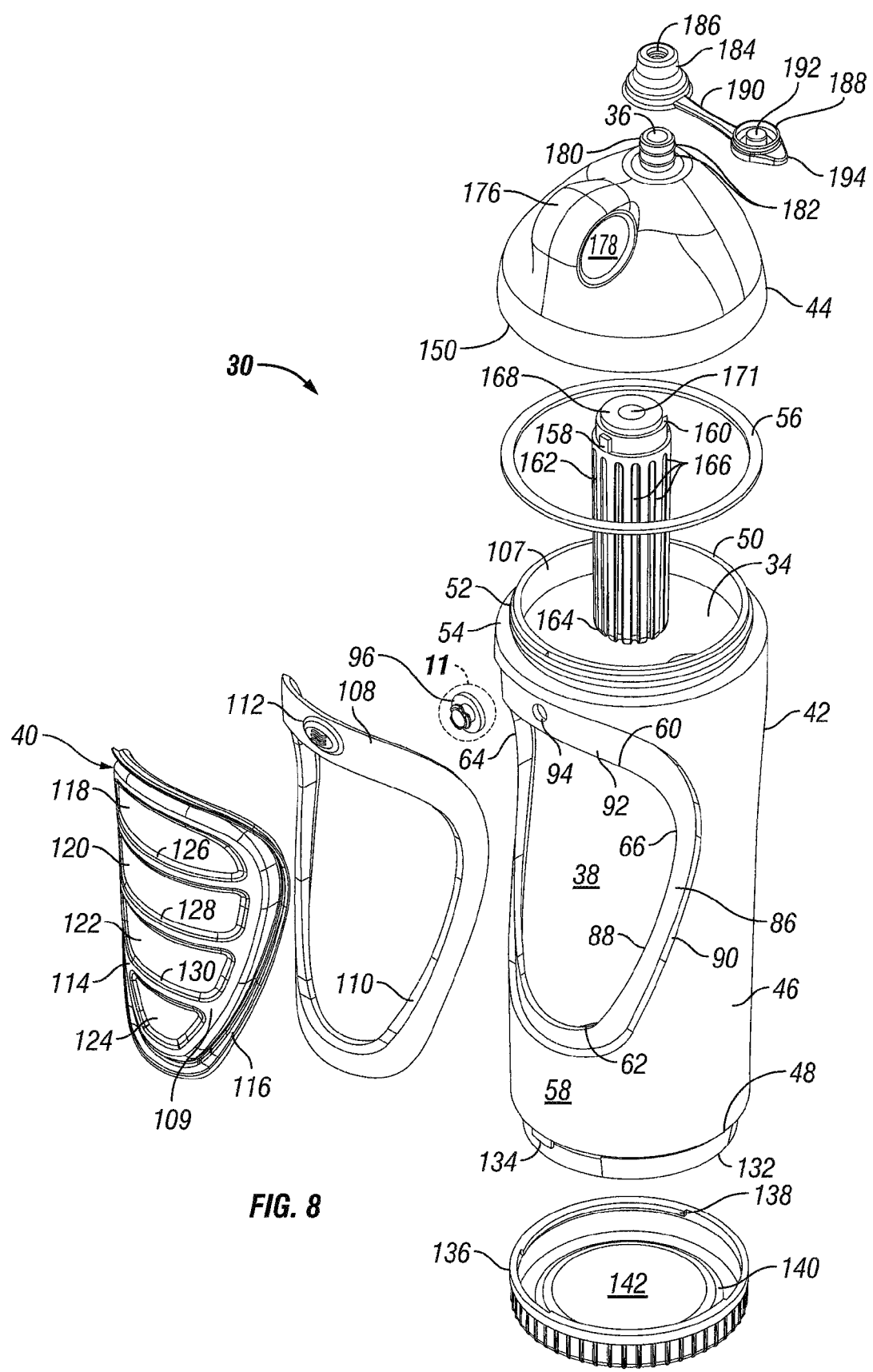
FIG. 8 is an exploded right forward upper perspective view of the uncapped portable fluid dispenser of FIG. 1, in reduced scale.

On the forward facing section 58 of the canister sidewall 46 as viewed in FIGS. 1-2 and 8, there is a void (also used interchangeably with the terms interruption, break, or opening in this description) in the canister sidewall that defines the aperture 38. The void substantially follows the curvature of the canister sidewall creating a enlarged opening in both the forward facing section 58 of the canister and wrapping around onto portions of the left and right sections 68 and 70 (FIGS. 3-4) of the canister sidewall 46. From a perspective view as best seen in FIG. 8, the aperture generally resembles an upside down truncated pyramid with outwardly bowed sides and rounded edges. In this exemplary embodiment, the upper edge 60 of the aperture 38 is disposed beneath the platform 54 of the upper open end 50 of the canister 42 while the lower edge 62 of the aperture is disposed about a quarter length of the canister from the bottom surface 48. The aperture gently tapers inwardly from top to bottom with the opposing widest points 64, 66 projecting along the left and right sidewalls 68 and 70 at about one-third of the canister width from the front surface 52 of the canister as best viewed in FIGS. 2-4 and 8.

Figure 3:
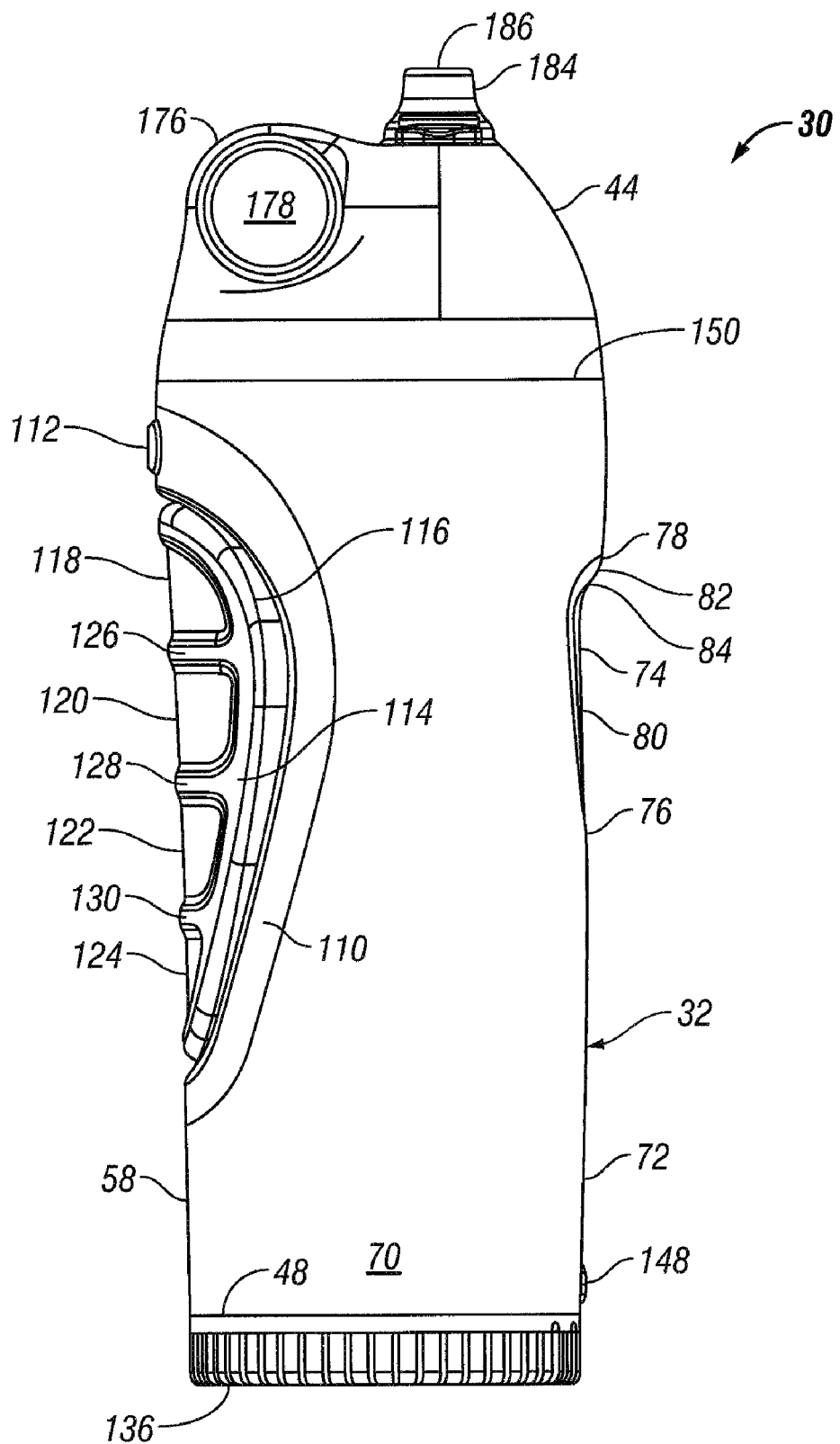
FIG. 3 is a right hand elevation view of the portable fluid dispenser of FIG. 1, in reduced scale.
Figure 4:
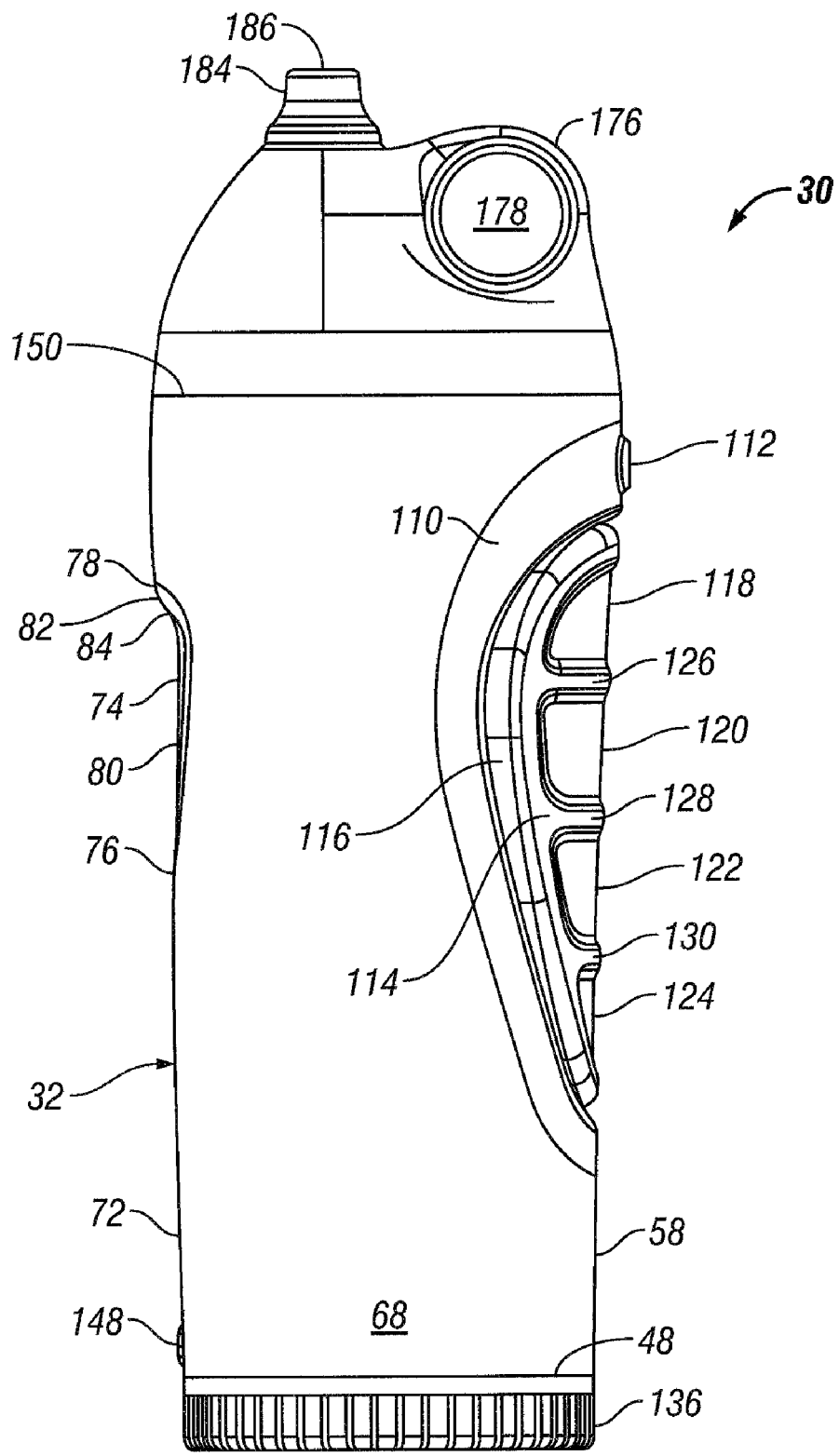
FIG. 4 is a left hand elevation view of the portable fluid dispenser of FIG. 1, in reduced scale.
Figure 5:
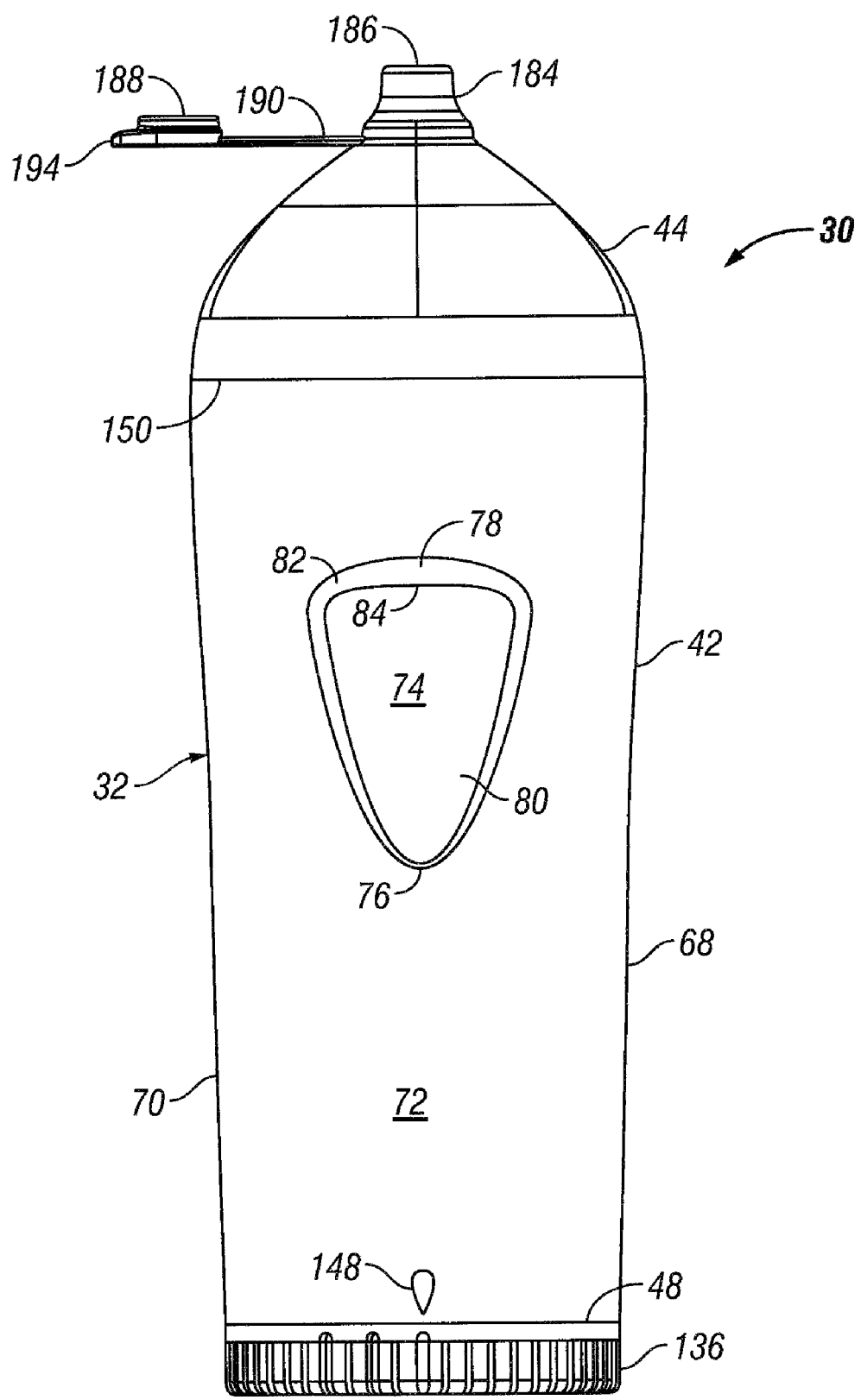
FIG. 5 is a rear elevation view of the portable fluid dispenser of FIG. 1, in reduced scale.

With reference to FIGS. 3-4, the opposing side facing regions 68, 70 of the canister 42 are substantially smooth without interruption except for portions of the aperture 38 extending therein as best shown in FIG. 8. On the rear facing side 72 of the canister sidewall 46, as best shown in FIGS. 3-5, the contour of the canister is substantially smooth but includes a slight depression 74. The depression is centered in the canister sidewall 46 from left to right as viewed in FIG. 5 and disposed with its lower end 76 disposed close to the horizontal centerline of the canister 42 and its upper end 78 disposed about a quarter length of the canister beneath the upper rim 50. The depression includes a relatively flat surface 80 surrounded by a smooth transition beveled perimeter 82 resembling generally the shape of the aperture 38 in reduced scale. The upper region of the flat surface is slightly more recessed into the canister sidewall 46 to form a ledge 84. The depression is an optional feature facilitating the alignment and purchase of the user's thumb while the ledge feature may inhibit the bottle from slipping during use as will be described below. In this exemplary embodiment, the depression area is also constructed to provide a stable fixed, rigid base about which a user's grip may be levered, although other rigid regions of the canister sidewall 46 are also suitable for this function.

Figure 11:
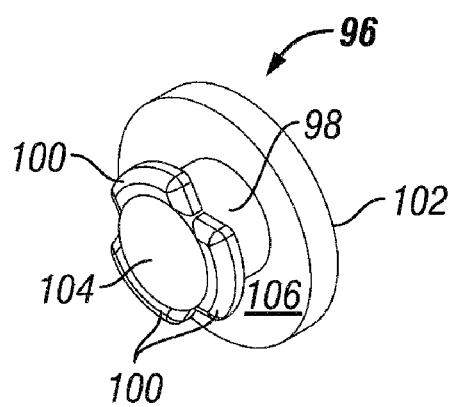
FIG. 11 is a right forward upper perspective view of an auxiliary vent valve taken from oval 14-14 in FIG. 8, in enlarged scale.

With reference now to FIG. 8, surrounding the aperture 38 in the forward facing sidewall 58 of the canister 42 is a recessed seat 86 having an inner perimeter 88 that defines the outer edge of the aperture and an outermost rim 90 flush with the outermost surface the canister sidewall 46. In the central upper region 92 of the seat is an auxiliary vent valve capture port 94 in the form of a through bore in the wall of the seat resulting in communication between the outer wall of the seat and the fluid storage chamber 34. The capture port is constructed to receive and capture an auxiliary vent valve 96 as best shown in FIGS. 8 and 11. The vent valve includes a central post 98 (FIG. 11) terminating at one end in a set of three flanges 100 spaced equidistantly around the end of the post and terminating at the opposing end in an enlarged cylindrical disc 102. The flanges project from the end of the post in substantially the same direction as the enlarged disc. The outermost end 104 of the post is sealed. The vent valve may be constructed of a relatively soft, pliable plastic or elastomeric material. The flexible flanges and short post may be popped through the capture port 94 so that the outwardly facing surface 106 of the enlarged disc is abutting the interior surface 107 of the canister 42. The flanges prevent the vent valve from completely being withdrawn into the fluid storage chamber under a vacuum pressure or pressure differential. The length of the valve post allows the vent valve to slide back and forth within the capture port. When pressure is exerted from inside the fluid storage chamber 34 on the interior facing surface of the enlarged disc, the vent valve acts as a seal on the capture port and prevent fluid from exiting the capture port.

On the other hand, when a vacuum force is created inside the fluid storage chamber 34, then vent valve 96 may be jogged inwardly to allow air to enter through the capture port to equalize the bottle pressure with ambient pressure. The vent valve permits venting of air into the container to equalize the inside and outside pressures of the fluid storage chamber 34 when the squeezing forces are removed from the button 40 as occurs during use as described below. Thus, it will be appreciated that the vent valve may be used as a secondary relief valve and thus improve the speed of the equalization process over the filter (described below) alone.

Figure 14:
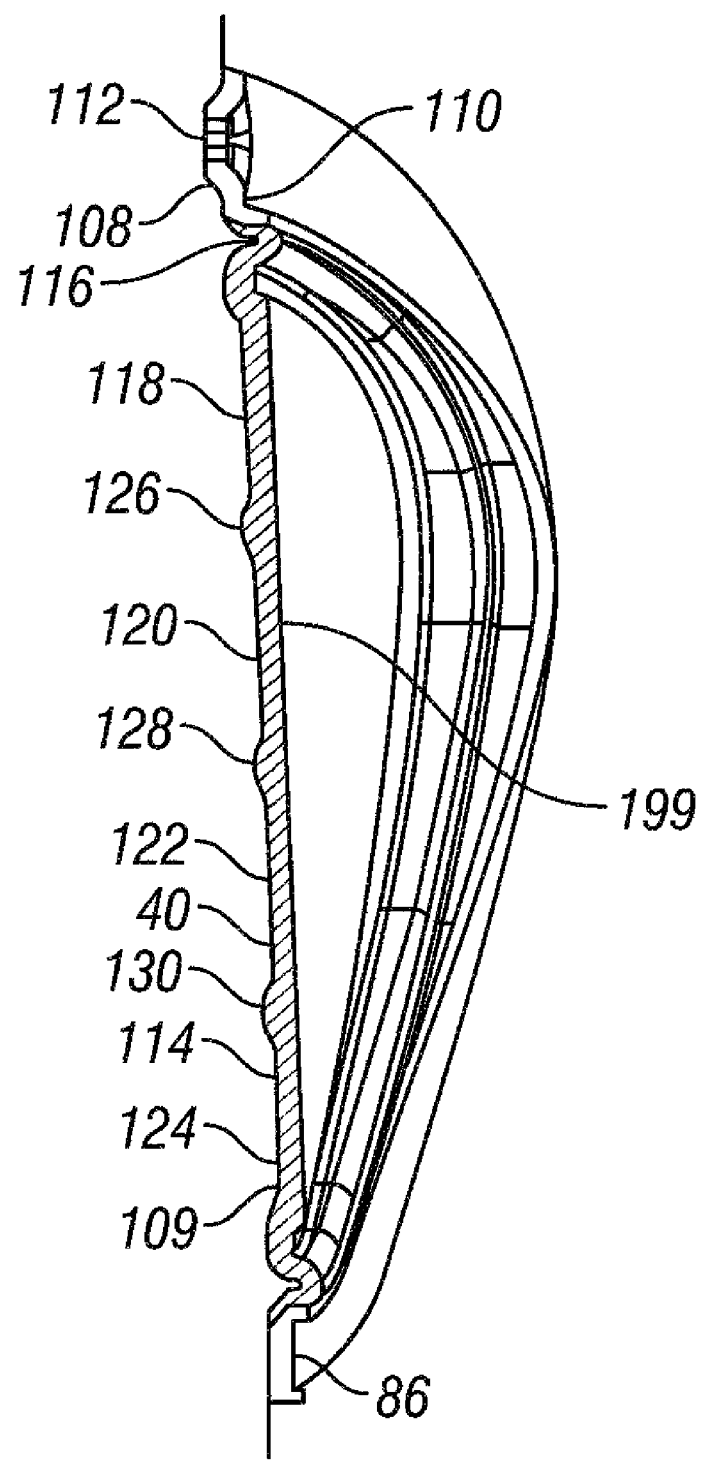
FIG. 14 is a cutaway taken along lines 14-14 of FIG. 2 showing the button and frame interface of the fluid dispenser of FIG. 1.

Referring now to FIGS. 2, 8 and 14, the seat 86 (FIGS. 8 and 14) also provides a form fitting mounting surface for a complementary shaped rigid frame 108 that is also shaped substantially similar to the aperture 38 and nested into the seat. The frame may be molded onto, integral with, chemically bonded or adhered, or mechanically fastened to the canister seat 86 and may be permanently or removably affixed to the seat. The frame itself includes a convenient peripheral ledge 110 that may serve as a mounting surface for accommodating a chemical or mechanical bonding process of the button 40 to the frame if that process is used.

In the upper central region of the frame 108 is a wave shaped vent 112 with a set of three parallel openings. The vent slightly protrudes from the surrounding frame area. When the frame is secured to the seat 86, the vent is aligned with the vent port 94 and vent valve 96 to channel air to the vent valve.

The button 40, also used interchangeably with the terms fluid displacer, volume reducing device, depressable region, filter assist, or flow rate booster in this description, is also shaped similar to the frame 108 and the aperture 38 in the form of an upside down truncated pyramid with rounded corners and outwardly bowed edges when viewed from the front as best seen in FIG. 2. The button also generally follows the contour of the removed section of the cylindrically shaped canister 42 as the outer surface 109 of the button is substantially flush with the outer surface of the canister sidewall 46 when secured to the mounting frame 108. However, it will be appreciated that the outer surface of the button or portions thereof may extend beyond the circumference of the canister sidewalls or recessed in relation thereto and that the frame may overlap a portion of the button as a further protective covering.

In this exemplary embodiment, the button 40 is preferably overmolded onto the frame 108 using a chemical or mechanical bonding process using conventional overmolding techniques. However, the button may also be permanently or removably coupled to the frame using other suitable conventional joining techniques including sonic welding or mechanical fasteners or other chemical bonding processes as well. While the frame provides a convenient mounting surface, the use of the frame is optional and the button may also be adhered, welded, bonded onto, or mechanically fastened directly to the canister wall surrounding the aperture or formed integrally with the canister 42.

With continued reference to FIGS. 1-4 and 8, the button 40 includes a main gripping section 114 providing the primary depressable region and a peripheral recurved mounting rim 116 that is anchored to the frame 108. Within the gripping section is a set of four vertically aligned and spaced apart finger plates (also referred to as grooves, recesses, or pads) including an uppermost plate 118, a top middle plate 120, a lower middle plate 122, and a lowermost plate 124. The uppermost plates 118 and 120 may be sized to accommodate typical index and middle fingers while the lowermost plates 122 and 124 may be sized to accommodate typical ring and pinky fingers with the bottom edge of the button narrower than the top edge of the button. Separating each plate is a series of raised transverse upper, middle, and lower ridges 126, 128, 130, respectively resulting in the plates forming a recess for receipt of each of the user's fingers. The ridges may provide some stiffness to the button and also help to align the user's fingers in each finger plate/recess. This facilitates the prevention of the dispenser slipping during use. The outer surface of the button may also be constructed of a slip-resistant material.

The outer edge of the button 40 includes a recurved mounting rim or flange 116 (FIGS. 8 and 14 for example) for nesting into the rim 110 of the frame 108 and providing a larger surface area for bonding/overmolding the button onto the frame as well as creating flexibility at the edge of the button. The bent portion of the button is received in a recess/indentation 110 in the frame. When the button is secured to the frame, this forms a seal over the aperture 40 and effectively seals off the canister 42 portion of the fluid storage chamber 34 except for the open top end 50.

The button 40 is also preferably puncture resistant and may be depressed inwardly from its normal position (indicated as A in FIG. 13) relatively flush with the outer circumference of the forward facing region 58 of the canister sidewall 46 toward the depression 74 in the opposing rigid canister sidewall 72 and may even be constructed with sufficient elasticity to contact the opposing sidewall. As the button is depressed, the surrounding rigid frame 108 and canister sidewall 46 preferably remains substantially or completely undeformed. In this first exemplary embodiment, the entire button is formed of a resilient material including the finger gripping region 114 and the surrounding peripheral recurved surface 116 forming a depressable region surrounded by a relatively rigid structure provided by the frame and canister sidewall. However, it will be appreciated that portions of the button may be constructed of more rigid materials as for example a button with a hard plastic center and a resilient collar or a plurality of rigid sections spaced apart by resilient regions. The button may also bulge slightly outwardly under pressure of the contents of the fluid storage chamber but is preferably selected from a material resistant to bulging in relation to the capacity selected.

Figure 6:
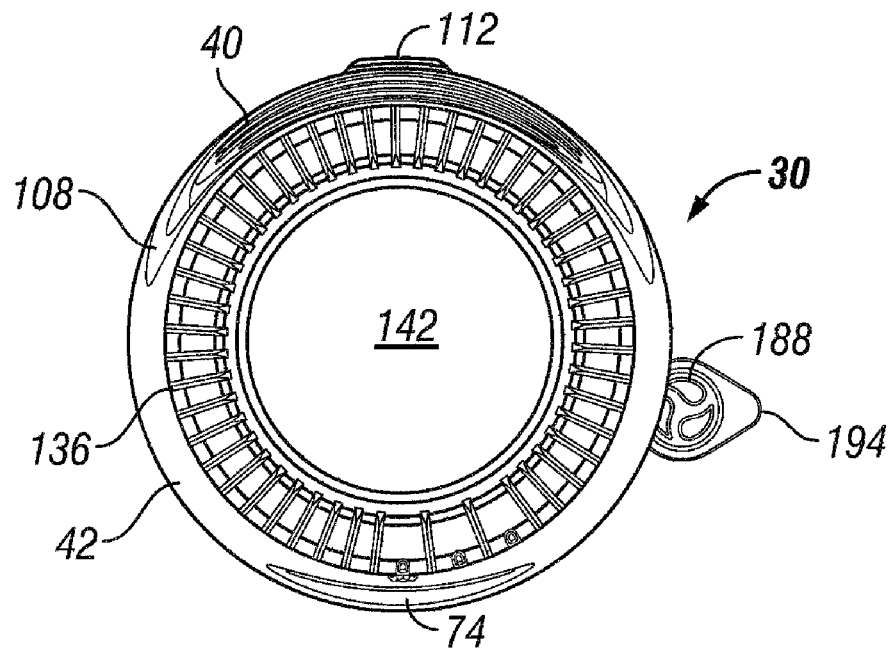
FIG. 6 is bottom view of the portable fluid dispenser of FIG. 1. in reduced scale.
Figure 15:
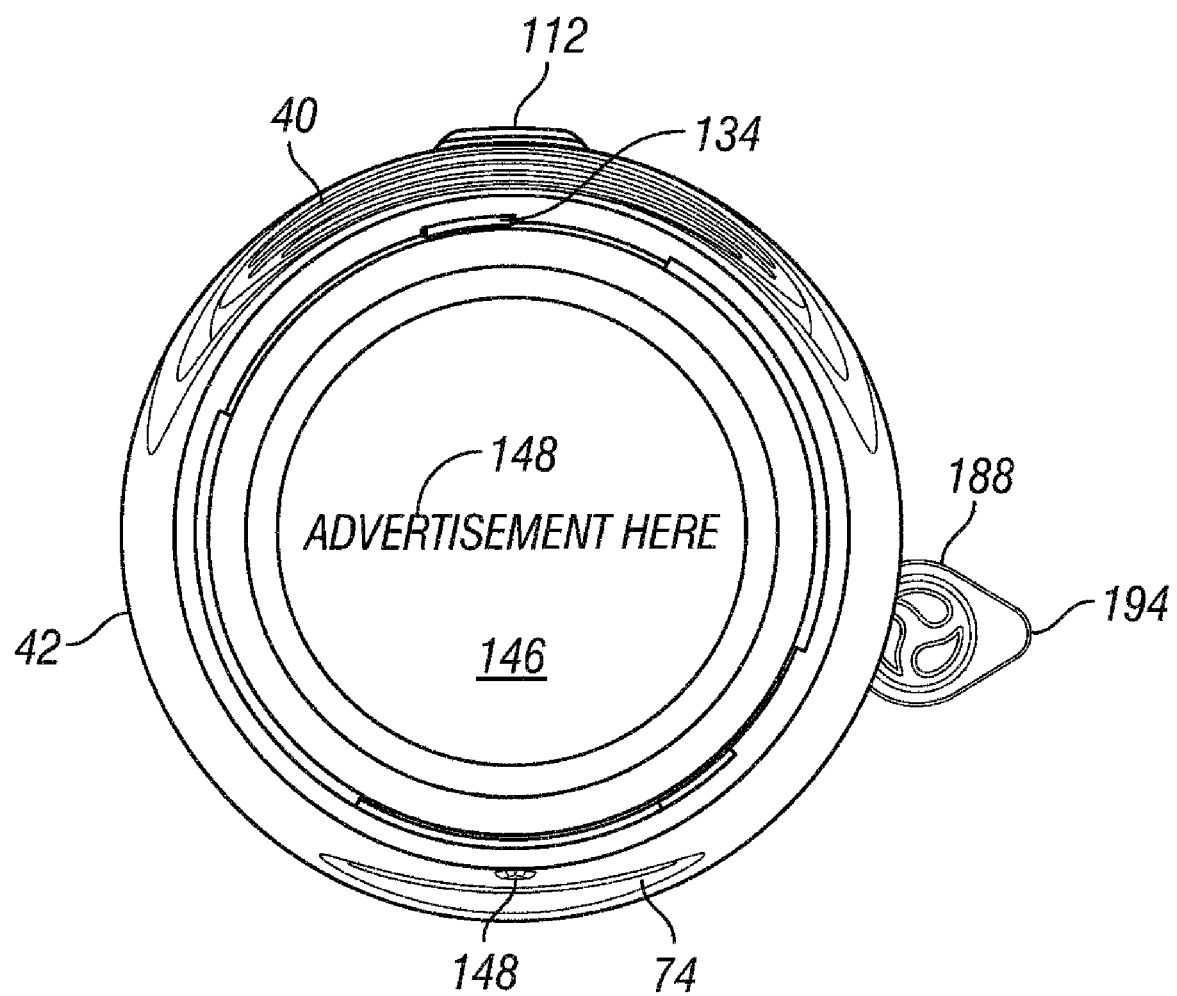
FIG. 15 is a similar view to FIG. 6, in enlarged scale, with an optional insert positioned on the bottom on the dispenser and the bottom piece removed.

Referring to FIGS. 1, 6, and 8, the base 48 of the canister includes a short cylindrical extension 132 of a reduced diameter and a set of external recessed flanges 134 for receipt of a base piece 136 having complementary flanges 138 that may be removably engaged using a screwing motion on the bottom of the canister to engage the complementary flanges 134 and 138. This base piece is an optional feature and may provide some extra weight to the bottom of the dispenser 30 or be useful to protect the bottom of the canister in lieu of or in addition to thickening the bottom surface 48 of the canister 42. The removable bottom piece also contains a tray 140 having a central opening 142 for receiving and holding a disc 144 of printed indicia 146 to the bottom of the canister 42 as best seen in FIG. 15 for advertising or cosmetic appearances. Thus, the user may swap out discs as desired.

A use indicator 148 appears just above the removable bottom piece 136 when secured to the canister sidewall 42 in the rear facing region 72 as seen in FIG. 5. The bottom piece may include a number, calendar date, or other metric (not shown) that may be rotated along with re-positionable bottom piece to align with the use indicator to help the user in monitoring filter replacement timing. It will be appreciated that the bottom piece is not an essential component and may be left off altogether with the canister terminating in a lower surface as described herein or in a manner similar to a conventional water bottle.

Moving onto the dome-shaped lid 44 or cap as shown in FIGS. 1-5 and 7-8, and 12, the lid includes a lower most edge 150 with an internally threaded region 152 (FIG. 12) that complements the threaded neck 52 of the upper rim 50 of the canister 42. By placing the bottom edge 150 of the lid over and against the platform 54 of the canister 42 and twisting the two components together a quarter or more turns, the lid and canister become threadably engaged and thus may be removably coupled together. Reversing the motion will remove the lid from the canister. Before coupling the lid to the canister, it will be appreciated that a gasket 56 may also be placed around the threaded neck 52 on the platform 54 of the canister 42 like a collar to form a better internal seal between the two components. As shown in FIG. 1, the gasket 56 is preferably positioned internally to the outer surfaces of the lid/canister threaded coupling to contribute to the creation of a smooth relatively continuous exterior finish where the two components join together.

Figure 12:
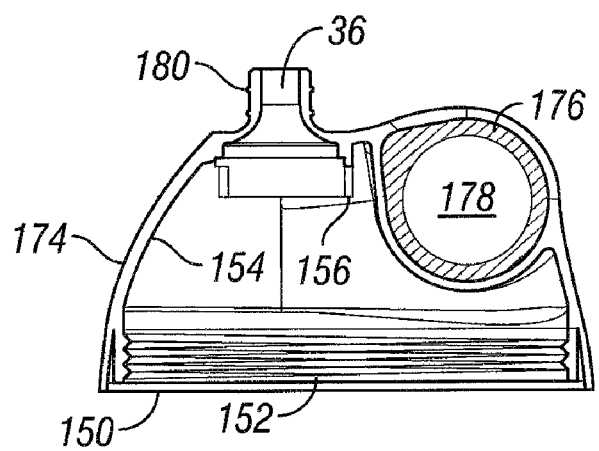
FIG. 12 is a cutaway through the lid of the fluid dispenser of FIG. 1 taken along lines 12-12 of FIG. 2 with the mouthpiece removed.

Referring now to FIG. 12, the interior surface 154 of the lid 34 includes a short cylindrical filter mount 156 in line with the exit port 36. The filter mount is in the form of a short collar and projects from the interior surface of the exit port into the interior lid space created by the dome shape. The filter mount may include an alignment slot or groove (not shown) for receiving a complementary boss 158 (FIGS. 8 and 10) at the top end 160 of a cylindrical filter housing 162 (FIGS. 8-10) to assist in aligning the filter housing with the filter mount. The filter housing may be snap fit or interference fit into the filter mount and releasably retained thereon. It is also contemplated that the filter housing may be threadably engaged with the filter mount. It is preferable to form a tight fitting seal between the upper end 160 of the filter housing and the filter mount to ensure fluid will not circumvent the filter during use.

Figure 9:
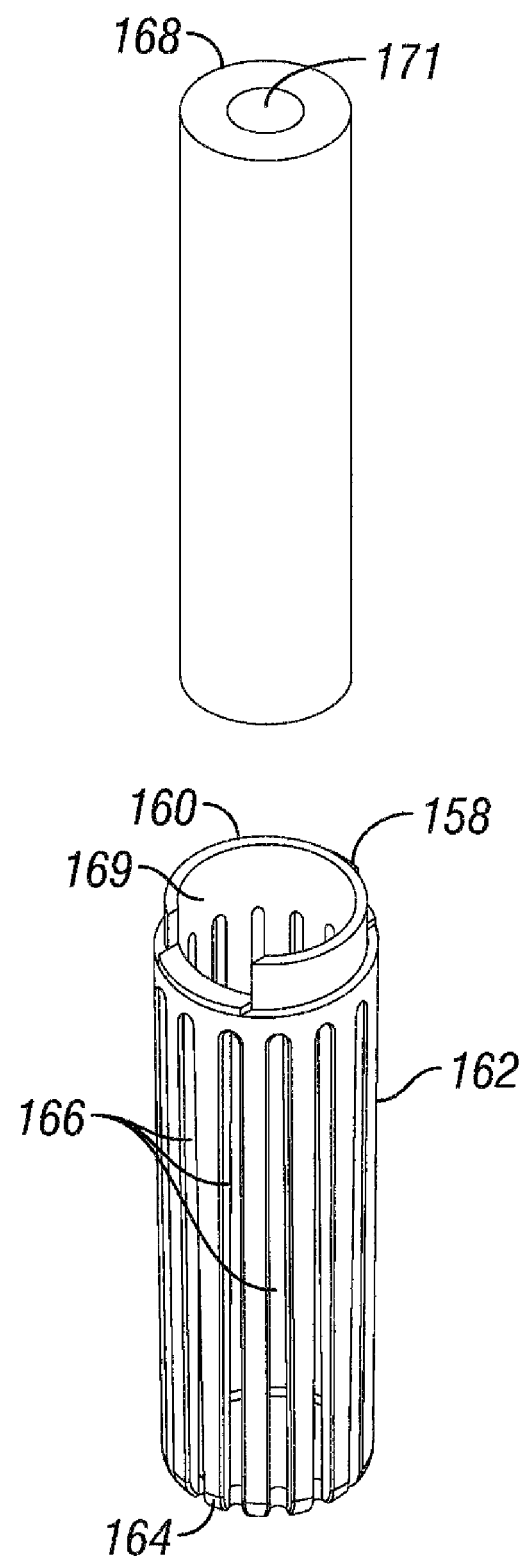
FIG. 9 is an exploded right forward upper perspective view of an exemplary filter housing and filter cartridge that may be used in conjunction with the portable fluid dispenser of FIG. 1.
Figure 10:
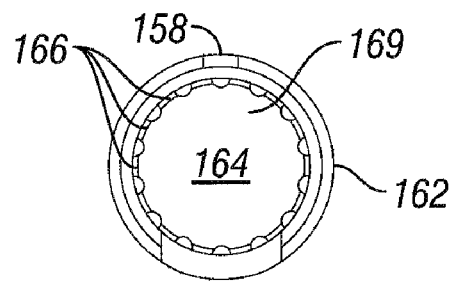
FIG. 10 is a top plan view of the filter housing of FIG. 9 with the filter cartridge removed.

With continued reference to FIGS. 8-10, the filter housing 162 extends toward the canister 42 with its lower end 164 residing within the portion of the fluid storage chamber 34 formed by the canister when the lid is secured thereon and includes a series of elongated, circumferentially spaced equidistantly apart slots 166 projecting along its length. The filter housing terminates at its lowermost end 164 in a flat base and the filter slots may extend from the sidewalls of the housing to extend into the base area or the base area may be completely solid.

With continued reference to FIGS. 8 and 10, a cylindrical filter cartridge 168 (filter and filter cartridge may be used interchangeably herein) having substantially continuous liquid-porous sidewall projecting from a closed bottom and leading to open top and having a hollow middle 171 may be provided. The filter cartridge may be slidably inserted into the open center 169 of the filter housing 162 prior to coupling the filter housing to the filter mount to improve the fluid quality being expelled from the fluid storage chamber 34 and out of the exit port 36. Although it is preferable to use a relatively long life filter cartridge, it will be appreciated the filter cartridge may easily be replaced when necessary by simply uncoupling the filter housing and slipping the used cartridge out of the uncoupled housing and then placing a new cartridge in the housing. The filter cartridges may be selected from micro porous filter cartridges, filter blocks, granular package inserts, or composite filters useful for common, everyday use to improve the fluid quality by removing or reducing contaminants and/or odors and improving taste while providing a suitable flow rate as assisted by the button 40. Preferred filter materials include carbon, either in block or granular form, carbon composites, or a filter cartridge containing a coconut based material. Preferably, the filter may also be useful for removing chemicals commonly found in the water supply such as chlorine, lead, mercury, copper, and other heavy metals. More advanced filters may also be used to remove other chemicals, organisms, and particulate as well including bacteria, viruses, *E. coli, Giardia, Cryptosporidia*, and/or harmful protozoa. It may also be desirable to provide a filter cartridge infused with or in addition to flavor and/or vitamin supplements to alter the taste, odor, and/or quality of the fluid exiting through the filter.

Figure 16:
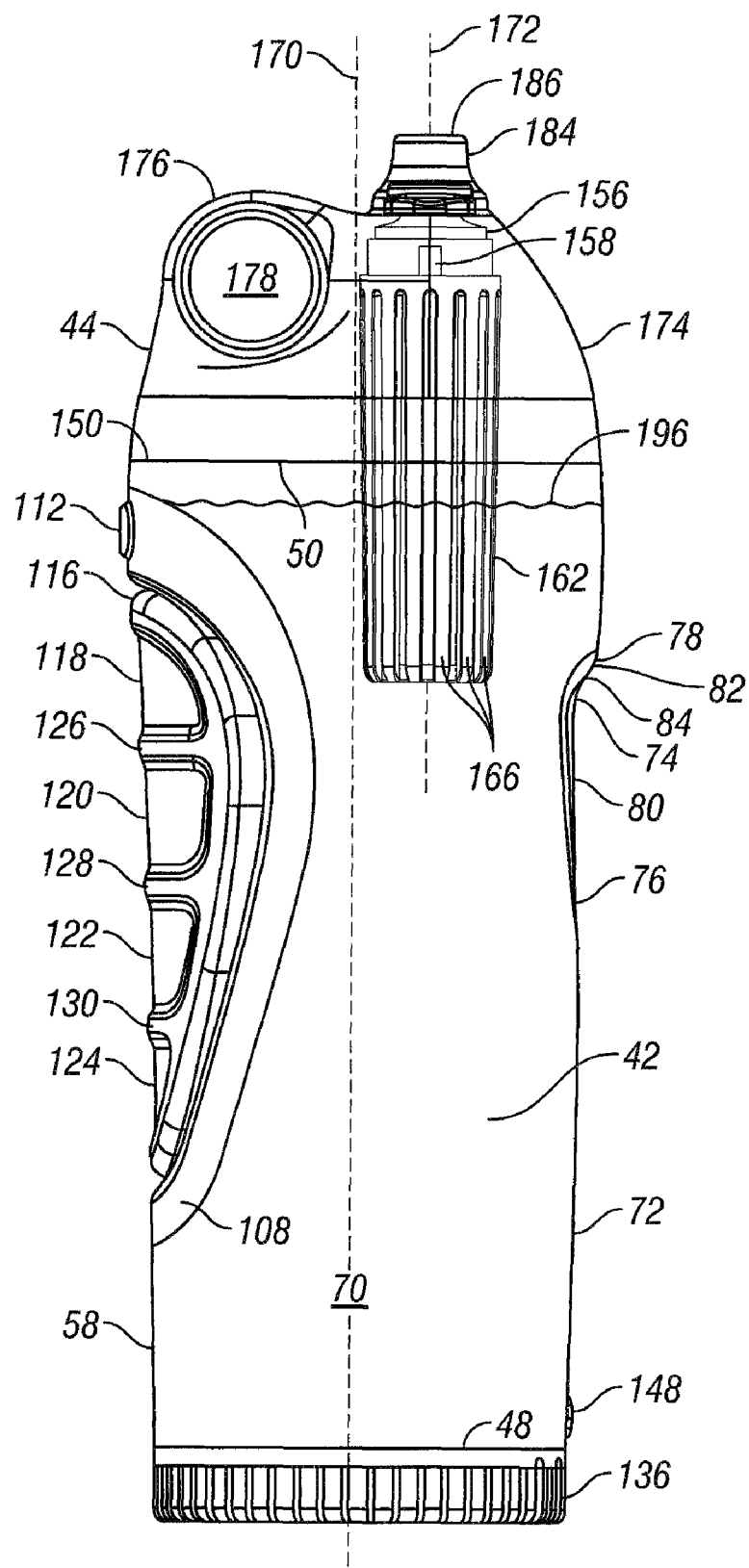
FIG. 16 is a similar view to FIG. 3 with the fluid dispenser having a transparent canister and lid and a holding a quantity of fluid.
Figure 17:
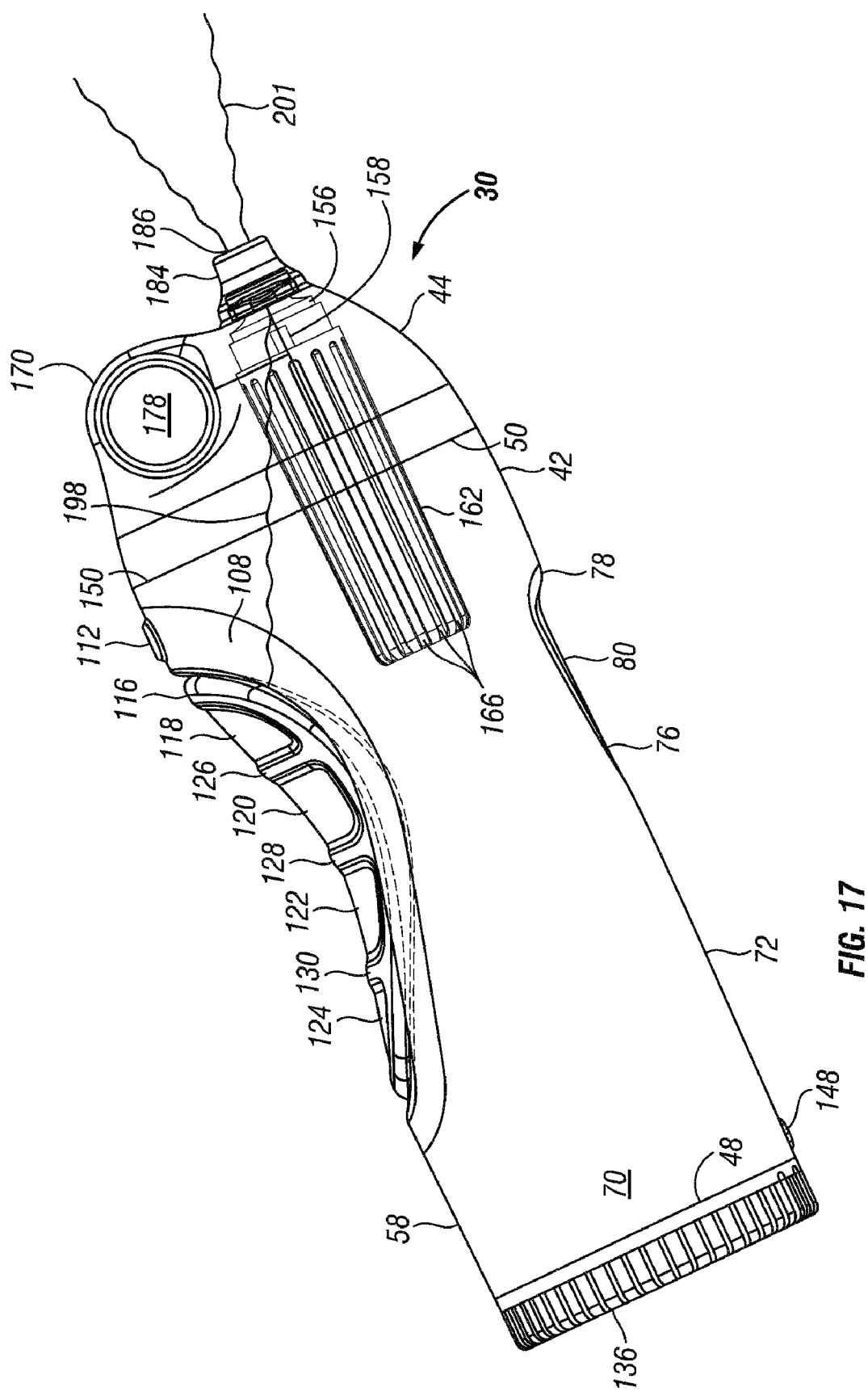
FIG. 17 is a similar view to FIG. 16 with the dispenser tilted and the depressable region depressed inwardly to expel fluid out of the dispenser port.

It will further be appreciated that the filter housing 162 may be disposed off center from the vertical centerline 170 as shown in FIG. 16 to improve contact with the fluid in the fluid storage chamber 34 as the dispenser is tipped in use and also to reduce any interference that may otherwise be created by the button distending too far into the fluid storage chamber. In this exemplary embodiment, the vertical axis 172 passing through the filter housing is disposed closer to the rear facing surface 72 than the front facing surface 58 of the canister 42. As described below, the rear facing surface is typically facing downward in use and thus the filter is disposed near the lower surface of the dispenser 30 to ensure the maximum of fluid contact with the filter.

With continued reference to FIGS. 1-5 and 7, the exterior surface 174 of the generally dome-shaped lid 34 includes a bulbous extension 176 and a convenient through bore 178 for receiving a carabiner (not shown) or strap for suspending the dispenser. The through bore is preferably large enough to accommodate a single finger or two fingers pinching together into the through bore for most people as well.

As shown in FIG. 8, the exit port 36 may include a short neck 180 forming a spout with a set of two spaced apart ridges 182 to receive an molded mouthpiece 184 that slips over the spout and is retained in place by the ridges 182 subject to removal by the user if necessary for replacement or customization purposes. The mouthpiece may be in the form of a bite valve, reciprocal manual valve, push-pull valve, twist valve, quarter-turn valve, baby bottle nipple, simple tube, elongated straw, or other suitable mouthpiece that can slip over the spout 180 opening. The mouthpiece includes a pass-through bore 186 aligned with the exit port 36 in the spout 180. The interior surface (not shown) of the mouthpiece includes complementary flanges for sliding over and engaging the spaced apart ridges on the spout neck to releasably hold the mouthpiece on the spout. It will be appreciated that the mouthpiece is replaceable and may be exchanged over time as necessary. The use of a preferred soft mouthpiece also cushions and protects the spout as well and the user's teeth as well.

Still referring to FIG. 8 and also to FIGS. 1-5 and 7, a removable cap 188 is connected to the mouthpiece 184 by a short tether 190 although it will be appreciated that the mouthpiece may be removable mounted on a portion of the cap. A central plug 192 extends from the interior surface of the cap for insertion into the through bore of the mouthpiece to seal the mouthpiece when the cap is placed thereon. A short flange 194 extends from the cap to facilitate its removal from the mouthpiece with an easy flipping motion.

In this exemplary embodiment, the canister 42 and button 40 cooperate to form the main fluid holding area of the fluid storage chamber 34 in which a user may add a quantity of fluid to store for transportation and retrieval with the lid 44 adding extra volume to the fluid storage chamber when the lid is coupled to the canister. As the dispenser 30 is tipped over from a vertical position, fluid may spill over from the canister into the lid. In this example, the fluid storage chamber 34 is constructed to hold 1-2 liters of fluid but this is not meant to be limiting in any manner and other suitable capacities will occur to one of ordinary skill in the art.

Materials and Construction:

In addition to the construction details described above, the canister 42, lid 44, and frame 108 are preferably formed of a hard, relatively crush or impact resistant plastic or metallic material. A preferable plastic such as BPA Free copolyester sold under the brand name Tritan and available from Eastman has been found to be suitable for these components. Thus, the canister, lid, and frame may each provide a portion of a relatively solid, fixed rigid region around the depressable button 40 to protect the fluid storage chamber 34 to provide the advantages of a rugged hard-walled container while providing a filter assist imparted by the button to improve the flow rate of fluid passing through the filter. Essentially, the canister and lid cooperate provide a hard protective casing around the fluid storage chamber.

The filter housing 162, and button frame 108 are preferably formed of a rigid plastic such as a material comprised of Food Grade Polypropylene. The mouthpiece 184, gasket 56, auxiliary vent valve 96, bottom piece 136, and button 40 are preferably formed of a Food Grade Silicone.

The canister 42, lid 44, frame 108, and filter housing 162 are preferably molded using conventional blow or injection plastic molding or extrusion techniques. Suitable conventional techniques for handling metallic materials to form the components may also be used. The frame may be aligned with and fixedly coupled to the recessed seat 86 on the canister 42 using conventional sonic welding, chemical bonding, adhering, mechanical fastening, or other suitable techniques or may integrally molded with the canister. Alternatively, the frame may be removably coupled to the canister to facilitate frame and/or button replacement. The vent valve may be pushed through the capture port 94 and secured therein prior to securing the frame 108 to the canister 42.

The button 40 is preferably overmolded onto the frame 108 with the recurved perimeter region 116 engaged with the mounting rim 110 of the frame but may also be removably coupled to the frame or coupled directly to the canister sidewall 46 bypassing the frame altogether. In such case, the canister wall provides a rigid region around the button. It will be appreciated that the button may be depressed or distended to an opposing sidewall 72 of the dispenser 30 without deforming the surrounding rigid frame 108 or canister sidewall 46.

Other overmolded pieces include the bottom piece 136 (onto the bottom base 48 of the canister) and soft mouthpiece 184 (onto the exit port spout 180). The soft mouthpiece 184 may optionally be removable from the spout to facilitate replacement or customization. The gasket 56 and auxiliary vent valve 96 may be constructed using conventional stamping, injection molding, or overmolding techniques as well. For example, in addition to be a separate, stamped component, the gasket may alternatively be overmolded onto the threaded portion of either the lid 44 or the canister body 32 or may be an overmold on the platform 54.

Usage of Embodiment No. 1

Referring now to FIGS. 1, 8, and 16-17, in use, starting with a fully assembled dispenser 30 as viewed in FIG. 1, the user may unscrew the lid 44 from the canister 42 to expose the primary portion of the fluid storage chamber 34. The user may then pour the desired amount and type of fluid into the fluid storage chamber up to a fill line represented by the lower edge of the threaded neck 52. As shown in FIG. 16, the water line 196 is just below this fill line. If the filter cartridge 168 needs changing as determined by observation of discoloration or contamination build up, the user may turn the lid upside down and uncouple the filter housing 162 from the filter mount 156 (FIG. 12) on the lid by pulling the filter housing in an axial direction away from the filter mount. With the filter housing removed, the used and exposed cartridge may be slidably retrieved from the filter housing and a new one inserted therein. The filter housing may then be re-coupled to the filter mount and is snap fit or interference fit into place to ensure a snug fit and tight seal. If the optional alignment boss 158 is used, the boss and complementary slot in the filter mount are aligned prior to engagement.

The user may then turn the lid 44 over and guide the filter housing 162 into the fluid storage chamber 34. Once the lid is nested on or near the upper platform 54 of the canister 44, the lid may be screwed onto the canister to form a tight seal and close off the fluid storage chamber 34. If the cap 188 is off, the user may fold the tether 190 over onto itself and align the plug 192 with the mouthpiece opening 186 and depress the cap until it snaps onto the mouthpiece 184. The user may then transport the dispenser 30 as one would an ordinary water bottle without concern of leakage. Alternatively, the user may attach a strap or carabiner clip (not shown) through the through bore 178 of the ring attachment 176 (bulbous region of the lid 44) or place a finger through the through bore and suspend the dispenser therefrom.

When the user desires to imbibe from the dispenser 30, the user may remove the cap 188 from the mouthpiece 184 with a simple flip motion on the cap flange 194 to disengage the cap. The user may then gain favorable purchase of the canister 42 by aligning one or more fingers in the respective finger plates 118, 120, 122, and 124 of the button 40 and a thumb on the depression or recess 74 on the opposing sidewall 72 of the canister. The user may then tilt the mouthpiece 184 of the dispenser 30 toward the user's mouth and place his or her mouth on the mouthpiece using a conventional bottle drinking motion. It is preferred that the thumb depression is facing downwardly and the button is facing upwardly to maximize the coverage of fluid on the offset filter.

Figure 13:
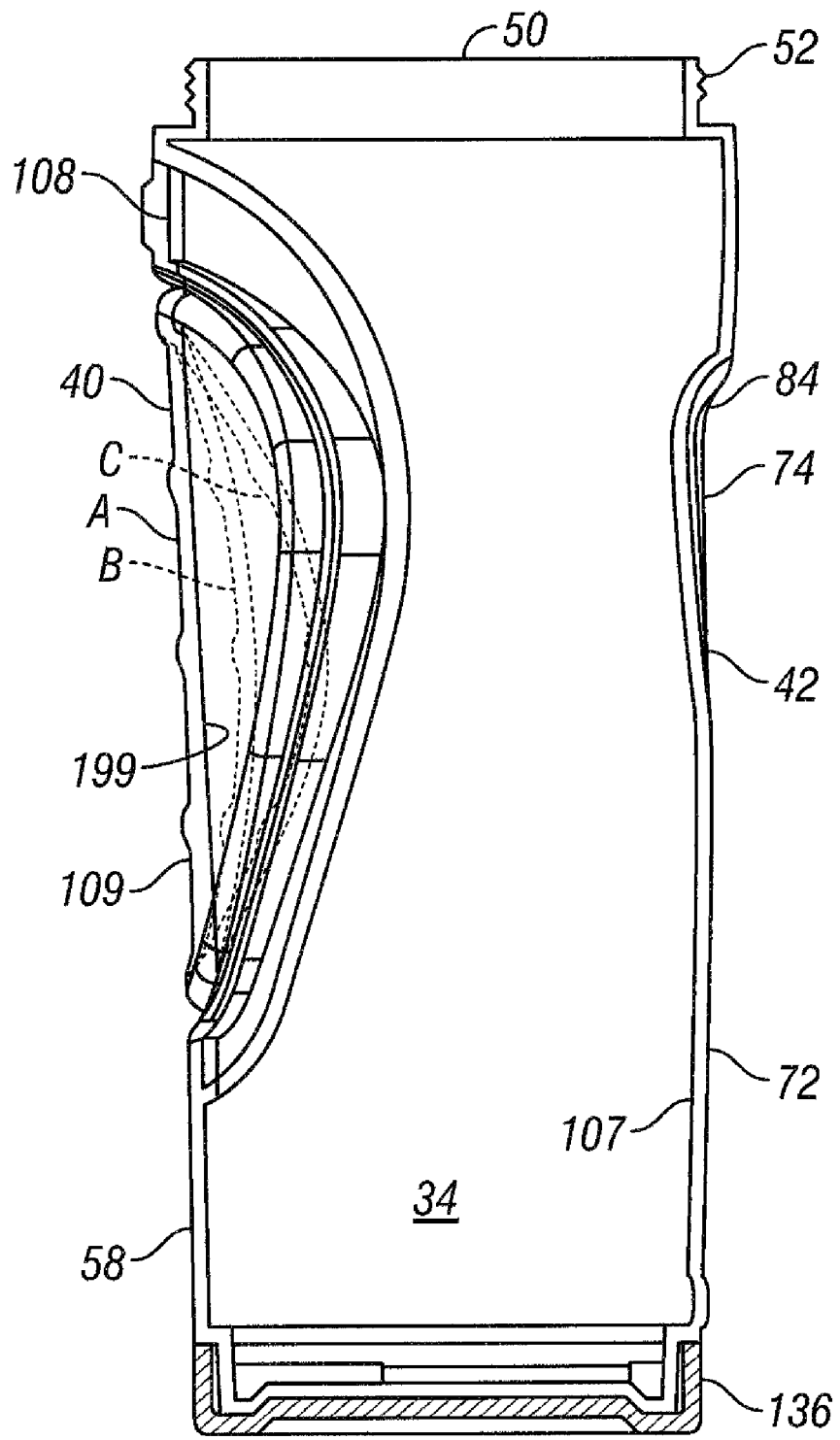
FIG. 13 is a cutaway taken along lines 13-13 of FIG. 2 showing the interior surface of the front central portion button reducing the volume of the fluid storage chamber in multiple positions A, B, and C.

With the bottle in a drinking position, the user may then selectively squeeze the button 40 from its original unflexed position as indicated at A in FIG. 13 toward the opposing sidewall 72 to a new position B (FIG. 13 and unlabeled in FIG. 17) using the opposing sidewall 72 and rigid depression 74 for leverage to distend the interior surface 199 of the button 40 into the fluid storage chamber 34 to reduce its volume. It will be appreciated that the button 40, when depressed, reduces the volume of the fluid storage chamber and displaces a corresponding amount of fluid therefrom. The user may selectively depress the button 40 to any position as indicated by position B or C in FIG. 13 or any other inwardly depressed position to force a desired quantity of fluid 201 through the slots 166 of the filter housing 162 to the filter cartridge 168 and on out of the exit port 36 through the mouthpiece 184 of the lid 44 and into the user's mouth.

When the button 40 is released, a slight vacuum may be created due to the resistance of the filter cartridge 168 and air will be slowly drawn back into the bottle through the filter in an attempt to equalize the interior bottle pressure with the surrounding ambient pressure. To speed up this process, the optional auxiliary vent valve 96 is provided and allows air from a second source of entry through the capture port 94 to enter back into the fluid storage chamber 34 and thus acts as an auxiliary equalization valve that complements air being drawn back in through the filter to speed up the process. As the fluid storage chamber 34 equalizes with the ambient pressure, the button 40 is fully restored to its original position. The user may repeat the squeezing and imbibing process as desired until the fluid storage chamber is empty and the refill as necessary.

It will be appreciated that the resiliency of the button 40 may enable a user to force fluid out of the fluid storage chamber without tilting the dispenser at all. While some air may be expelled prior to fluid in some instances, the button may be configured to expel all or substantially all fluid within the dispenser 30 at any angle as long as fluid covers or may be displaced to cover a portion of the slot area 166 of the filter housing 162 as exemplified by the water line 198 shown in FIG. 17. However, it is preferred to tilt the dispenser until the mouthpiece 184 is substantially parallel to the ground or pointing down to allow gravity to further assist the fluid flow rate imparted by the button and further ensure that fluid will be at least partially in contact with the filter slots 166. It will further be appreciate that the button may force out air in the fluid storage chamber 34 by reducing the chamber volume resulting in the fluid coming into contact with the filter slots 166 so that fluid may further be directed out of the exit port 36.

The amount of force required to direct fluid out of the mouthpiece 184 may vary with the filter porosity and strength of the user. However, a relatively gently squeezing force application to the button 40 will be sufficient in most cases and for most users.

Alternative Embodiment No. 2

Figure 18:
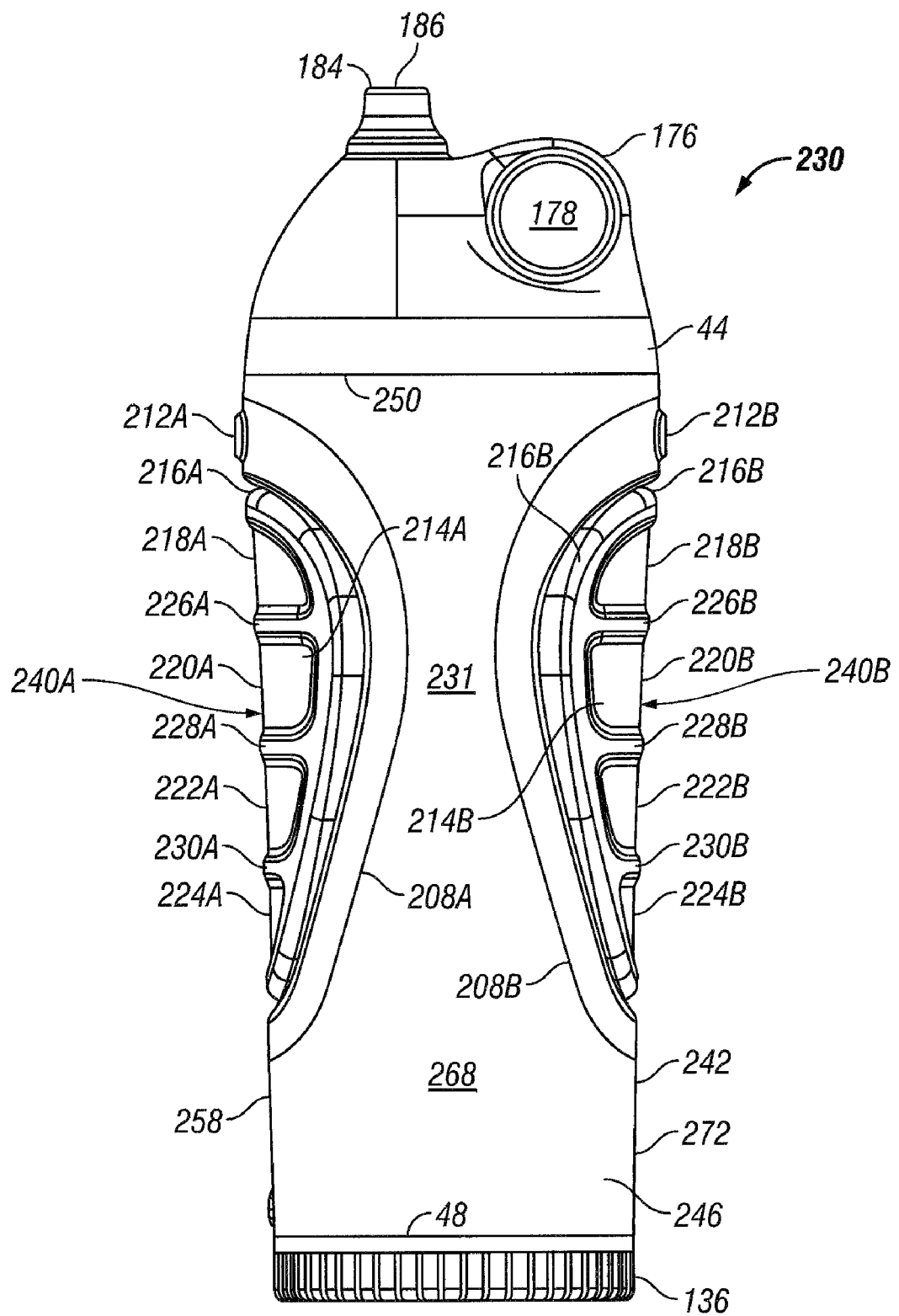
FIG. 18 is a similar view to FIG. 3 of an alternative embodiment of the portable fluid dispenser in accordance with the principles of the present invention.

Referring now to FIG. 18, an alternative embodiment of the portable fluid dispenser, generally designated 230, is illustrated. As many of the components in this embodiment are constructed similarly to those described in the first fluid dispenser embodiment 30, like components will numbered alike. For example, the lid and bottom piece in this alternative embodiment are identical to the lid 44 and bottom piece 136 as are the internal components not shown in FIG. 18 such as filter housing, cartridge, and filter mount described above. However, in this exemplary embodiment, the canister 242 has been modified to include a plurality of buttons 240a, 240b situated mainly on opposing sections 258, 272 of the canister sidewall 246 with the outermost portions of the respective buttons wrapping onto portions of the left sidewall region (not shown) and the right sidewall region 268. Each button 240a, 240b is constructed similarly to each other and to the button 40 described above and is preferably overmolded onto or otherwise secured to a frame 208a, 208b, respectively to cover and seal off an underlying aperture (not shown but constructed in the manner of the aperture 38 above) and cooperate with the remainder of the canister sidewall 246 to define the fluid storage chamber (not shown but similar to fluid storage chamber 34 described above but with two apertures).

The frames 208a, 208b are spaced below the upper edge 250 of the canister 242 and wrap around onto the left and right side sections of the canister 242 (only the right side 268 is shown in FIG. 18) with their nearest points spaced apart by a relatively narrow hourglass shaped region 231 of the canister sidewall 246. This hourglass region adds rigidity to the canister 242 between the buttons 240a, 240b.

Both buttons 240a, 240b have a finger gripping section 214a, 214b and a peripheral recurved mounting flange 216a, 216b, respectively. Within the gripping area 214a, 214b, each button 240a, 240b includes a set of finger plates (or pads) 218a, 220a, 222a, 224a, 218b, 220b, 222b, 224b, and separator ridges 226a, 228a, 230a, 226b, 228b, 230b, respectively. Each frame includes a vent 212a, 212b covering a vent valve (not shown) although these are optional as with the first fluid dispenser embodiment 30.

In use, operation is similar to that of the first embodiment 30 except that one or both buttons 240a, 240b may be covered with one or more of the user's fingers and opposing thumb and squeezed together to reduce the volume of the fluid storage chamber (not shown) to force fluid through the internal filter and out of the port 186 of the mouthpiece 184. Except for the buttons, the remainder of the dispenser body provides a rigid protective barrier to the fluid storage chamber.

In this exemplary embodiment, the buttons 240a, 240b are diametrically opposed on the canister sidewall 246. However, it will be appreciated that the buttons 240a, 240b, frames 208a, 208b, and underlying apertures may be situated at other positions on the canister 242 as well. For example, a separate button for each individual finger and thumb spaced apart on the canister sidewall may be used in accordance with the principles of the present invention. If a plurality of buttons are used, then the buttons may be of different sizes as well as a long at least one depressable region is provided and surrounded by a non-deforming rigid region and fluid may be forced out of the fluid storage chamber through the exit port when the depressable region is depressed.

Alternative Embodiment No. 3

Figure 19:
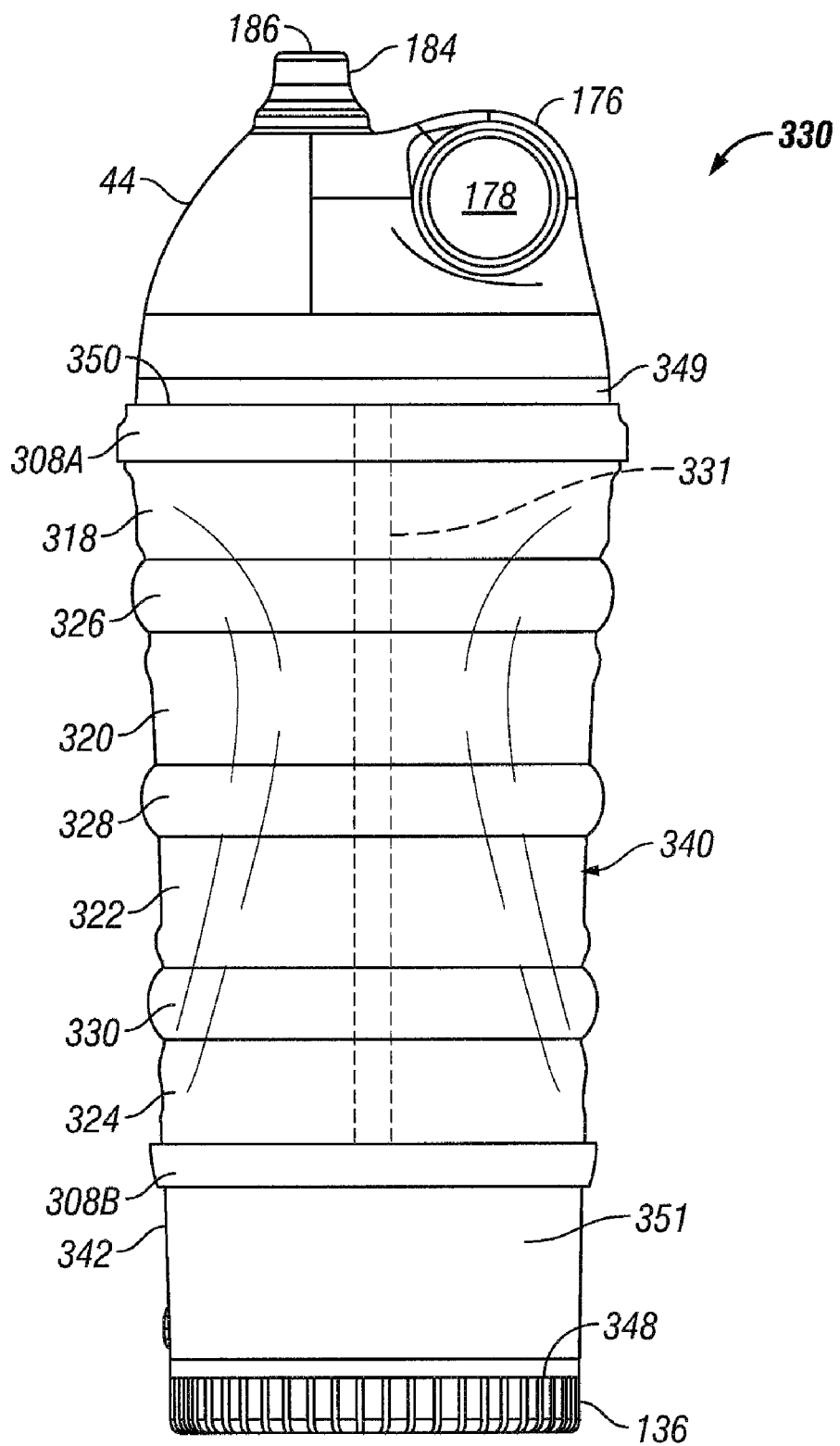
FIG. 19 is a similar view to FIG. 3 of another alternative embodiment of the portable fluid dispenser in accordance with the principles of the present invention.

Referring now to FIG. 19, another alternative embodiment of the portable fluid dispenser, generally designated 330, is shown. In this embodiment, the lid 44 and bottom piece 136 are again identical to the same components described above for the first embodiment 30 and other like components will be like numbered. In modified embodiment, the canister 342 includes a button, generally designated 340, extending around the circumference of the canister to form a continuous depressable region or sleeve disposed between an upper portion 349 of the canister and a lower portion 351 of the canister. These upper and lower canister portions are formed of a rigid material such as a hard plastic or metallic material. The upper end of the sleeve is secured to an upper frame 308a while the lower end of the sleeve secured to a lower frame 308b using the preferred overmolding process as with the first embodiment. Both frames form a set of spaced apart retention collars to anchoring the respective upper and lower ends of the sleeve.

The sleeve 340 includes a series of depressions 318, 320, 322, and 324 and separator ridges 326, 328, and 330 similar to the finger plates and ridges in the previous embodiments. In this exemplary embodiment, the depressions and ridges span the entire circumference of the sleeve. The sleeve 340 is preferably formed of relatively stiff elastomeric material sufficient to maintain the upper and lower portions 349, 351 of the canister 342 in a spaced apart relationship while yielding to a relatively slight squeezing pressure sufficient to force fluid out through a filter and exit port. The sleeve may be reinforced with one or more flexible stiffening ribs 331 that may be interior to or exterior to the sleeve and constructed similarly to the hourglass region 231 described above for the alternative dispenser embodiment designated 230 to provide additional rigidity to the structure.

In operation, this embodiment performs similarly to the dispenser 230 except that there is more surface area forming a depressable region for the user to choose from.

While the present invention has been described herein in terms of a number of preferred embodiments, it will be appreciated that various changes, uses, and improvements may also be made to the invention without departing from the scope and spirit thereof. For example, while certain metrics and capacities have been described herein, such uses are meant to be exemplary and not limiting in any manner. In addition, the preferred material for the rigid components such as the lid, canister, and filter housing are plastic although a metallic material is also contemplated. For the depressable regions, a relatively soft, resilient plastic or elastomeric material would be suitable.

It will be further be appreciated that the resilient portion of the button may either span the opening defined by the entire frame or just a portion thereof. A portion of the button may also be constructed of a rigid material and coupled to a surrounding rigid frame by a resilient coupler or material. The frame may also project across the aperture leaving gaps where the button covering may be depressed forming the depressable region as, for example, the frame extending across the aperture behind the gripping ridges in which case the finger plates would form depressable regions. The button or depressable region may include an outer surface that extends outside the circumference of the canister or bulge outwardly from internal fluid pressure or the outer surface of the depressable region may be recessed interior to the outer circumference of the canister so that the region is more protected.

While a two-piece dispenser body has been described above, the two-pieces may be integrated into or formed as a single unit. The exit port may also be enlarged to provide a suitable fill port as well or an optional fill port may be added so that the fluid storage chamber may be filled without removing the lid.

While the primary holding portion of the fluid storage chamber is defined by the interior surface of the button and canister sidewall in these exemplary embodiments, it is also contemplated that the aperture may not be a through bore such that the interior surface of the button forms a sidewall of the fluid storage chamber. Thus, the button does not have to be a seal in one wall of the fluid storage chamber. Instead the fluid storage chamber may be inwardly offset from the interior surface of the canister sidewalls such as in a dual walled canister or may be in the form of a flexible bag suspended inside the canister apart from the canister sidewall and coupled to the exit port/filter housing. The aperture may then be constructed to expose a portion of the fluid storage chamber sidewall from the outer canister wall so that a button at least partially covering the aperture forms a depressable region on the outer canister sidewall that may be depressed to deform and thus reduce the volume of the interior fluid storage chamber. Thus, the interior surface of the button need not directly contact the fluid stored therein but only a portion of the fluid storage chamber defining wall.

The walls of the canister may also be thickened considerably to provide a more rigid dispenser. To further protect the depressable region, a removable cover may be attached to the frame to cover the button area or the frame may be extended to cover a portion of the button leaving a smaller profile depressable region.

It will also be appreciated that the button will generally not interfere with a slip-on or wraparound beverage insulator, typically constructed of a flexible neoprene-like material, and may be operated in a similar manner with or without such insulator.

What is claimed is:

1. A portable fluid dispenser comprising:
    a dispenser body with a fluid storage chamber having an outwardly curved holding surface defining a first, non-planar contour with a substantially rigid region;
    an exit port in communication with the fluid storage chamber;
    an aperture in the rigid region of the dispenser body also in communication with the fluid storage chamber; and
    a button having at least a portion formed of a resilient material, the button having a periphery attached to a periphery the aperture and covering the aperture and substantially continuing the first contour of the outwardly curved holding surface across the aperture when in a relaxed substantially flush position, the button further including an interior surface constructed to at least partially reduce the volume in the fluid storage chamber when the button is manually squeezed by a user, and returning to the relaxed position when released; and
    a filter coupled to the exit port, the filter constructed to receive and filter fluid displaced from the fluid storage chamber as the button is squeezed and to direct the filtered fluid to the exit port.

2. The portable fluid dispenser as set forth in claim 1 wherein: an interior surface of the dispenser body defines at least a portion of the fluid storage chamber;
    the substantially rigid region of the dispenser body includes opposing sidewalls; and
    the button is disposed in one of the sidewalls and is constructed to be depressed toward the other of the sidewalls to reduce the volume of the fluid storage chamber.

3. The portable fluid dispenser as set forth in claim 2 wherein:
    the button is sufficiently resilient to contact the interior surface of the opposing sidewall when depressed.

4. The portable fluid dispenser as set forth in claim 1 wherein:
    the port includes a spout projecting from the dispenser body; and
    a hollow mouthpiece is removably coupled to the exterior surface of the spout.

5. The portable fluid dispenser as set forth in claim 1 wherein:
    the dispenser body includes a central vertical axis; and
    the filter includes a housing with a vertical axis offset from the central vertical axis.

6. The portable fluid dispenser as set forth in claim 1 wherein:
    the interior surface of the button forms a portion of the fluid storage chamber.

7. The portable fluid dispenser as set forth in claim 1 further including:
    a rigid frame on the dispenser body and defining the perimeter of the aperture; and
    the button is coupled to the rigid frame with the button constructed to be squeezed inwardly without deforming the surrounding frame.

8. The portable fluid dispenser as set forth in claim 1 wherein:
    the rigid region of the dispenser body is constructed of a substantially, crush-resistant material; and
    the interior surface of the button is constructed to yield under a squeezing pressure into the fluid storage chamber without deforming the surrounding rigid region.

9. The portable fluid dispenser as set forth in claim 1 wherein:
    the fluid storage chamber is hollow without obstruction and at least partially defined by the interior surface of the dispenser body.

10. The portable fluid dispenser as set forth in claim 1 wherein:
    the dispenser body includes a plurality of apertures, each aperture being covered by a button that may be selectively depressed to reduce the volume of the fluid storage chamber.

11. The portable fluid dispenser as set forth in claim 1 wherein:
    the filter includes a housing and a slidably removable filter cartridge.

12. The portable fluid dispenser as set forth in claim 1 further comprising:
    an auxiliary pressure equalization valve located on the dispenser body adjacent the button and away from the fluid retrieval port and in communication with the fluid storage chamber and constructed to assist the filter in equalizing the pressure within the fluid storage chamber when pressure on the button is released.

13. The portable fluid dispenser as set forth in claim 1 wherein: the dispenser body includes a removably mounted lid defining an upper portion of the fluid storage chamber; and the exit port is disposed on the lid and spaced apart from the button.

14. The portable fluid dispenser as set forth in claim 1 wherein:
    the port includes a hollow mouthpiece projecting in a first direction from the dispenser body and a filter mount projecting in a second direction into the fluid storage chamber; and
    the filter includes a filter housing with a filter cartridge, the housing constructed to removably couple to the filter mount to form a seal to direct a quantity of fluid from the fluid storage chamber through the filter and to the exit port when the button is Mr.

15. The portable fluid dispenser as set forth in claim 1 wherein: the button is elongated and constructed to be squeezed inwardly in a first direction and a longitudinal axis of the filter projects into the fluid storage chamber along a second direction that is substantially perpendicular to the first direction.

16. The portable fluid dispenser as set forth in claim 1 further including:
    a cap removably coupled to the dispenser body, the cap being integrally formed with the exit port and further including a filter mount that terminates above the fluid storage chamber;
    wherein the fluid storage chamber includes a single hollow compartment; and
    the filter is removably coupled to the filter mount.

17. The portable fluid dispenser as set forth in claim 1 wherein:

the button is a substantially thin, contoured, soft-walled region with an exterior surface substantially flush with an outer surface of the dispenser body when in a relaxed position and constructed to receive a squeezing force applied by a user to inwardly drive an interior surface of the button into the fluid storage chamber to reduce the volume therein, and return to the relaxed position when the squeezing force is removed, the button further being selectively squeezable to pressure-assist the removal of a volume of fluid from the fluid storage chamber undergoing a gravity feed through fluid retrieval port.

18. A portable fluid dispenser comprising:

a dispenser body with a curved sidewall projecting upwardly from a base section and terminating in an upper rim, the sidewall and base section cooperating to form a lower portion of a fluid storage chamber;

an upper dome-shaped covering constructed to mate with the upper rim of the dispenser body and forming an upper portion of the fluid storage chamber;

an exit port on the upper covering and having a spout projecting in a first direction from the upper covering and a filter mount projecting in an opposite a second direction into the fluid storage chamber;

a filter housing removably coupled to the filter mount and projecting into the fluid storage chamber with a bottom end of the filter housing being suspended proximate the upper rim, the filter housing forming a seal with the filter mount to direct fluid from the fluid storage chamber to the exit port;

a filter cartridge formed of a coconut-based material and disposed within the filter housing;

an aperture surrounded by a rigid region of the dispenser body and in communication with the lower portion of the fluid storage chamber;

a button having a periphery attached to a periphery the aperture and sealing off the aperture and forming a squeezable region constructed to yield inwardly under squeezing pressure applied by a user without substantially deforming the surrounding rigid region and to at least partially extend into the fluid storage chamber to reduce the volume therein and to displace a selected quantity of fluid, when fluid is stored in the fluid storage chamber, into the filter housing, through the filter cartridge, and out of the exit port; and an auxiliary pressure equalization valve located on the dispenser body adjacent the volume reducing device and in communication with the fluid storage chamber, the valve being constructed to assist in equalizing the pressure within the fluid storage chamber when applied squeezing pressure on the volume reducing device is released.

19. A portable fluid dispenser comprising:

a dispenser body defining a fluid storage chamber having a first sidewall and an opposing sidewall, both sidewalls being constructed of a substantially rigid material;

an exit port in communication with the fluid storage chamber;

a filter in communication with the exit port and forming a seal therewith, the filter projecting at least partially into the fluid storage chamber;

a fluid displacement port in the dispenser body in one of the sidewalls, the fluid displacement port also being in communication with the fluid storage chamber; and a button having a periphery attached to a periphery the fluid displacement port and sealing off the fluid displacement port, the button including a resilient region operable to be squeezed inwardly toward an opposing rigid sidewall without deforming the surrounding frame and without introducing air into the fluid storage chamber whereby a user may add a quantity of fluid to the fluid storage chamber and selectively displace a quantity of fluid through the filter and the exit port by squeezing the fluid displacer.

* * * * *

UNITED STATES PATENT AND TRADEMARK OFFICE
CERTIFICATE OF CORRECTION

PATENT NO. : 8,182,683 B1
APPLICATION NO. : 12/466781
DATED : May 22, 2012
INVENTOR(S) : Russell E. Allen Page 1 of 1

It is certified that error appears in the above-identified patent and that said Letters Patent is hereby corrected as shown below:

In the Claims:

Col. 16, line 50, "Mr" should be replaced with --squeezed--.

Signed and Sealed this
Tenth Day of September, 2013

Teresa Stanek Rea
*Acting Director of the United States Patent and Trademark Office*